United States Patent
Guim Bernat et al.

(10) Patent No.: US 12,348,424 B2
(45) Date of Patent: Jul. 1, 2025

(54) SYSTEMS, APPARATUS, AND METHODS FOR EDGE DATA PRIORITIZATION

(71) Applicant: Intel Corporation, Santa Clara, CA (US)

(72) Inventors: Francesc Guim Bernat, Barcelona (ES); Karthik Kumar, Chandler, AZ (US); Marcos Carranza, Portland, OR (US); Rita Wouhaybi, Portland, OR (US); Cesar Martinez-Spessot, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 17/359,204

(22) Filed: Jun. 25, 2021

(65) Prior Publication Data
US 2021/0328934 A1 Oct. 21, 2021

(51) Int. Cl.
*H04L 47/24* (2022.01)
*H04L 69/04* (2022.01)

(52) U.S. Cl.
CPC .............. *H04L 47/24* (2013.01); *H04L 69/04* (2013.01)

(58) Field of Classification Search
None
See application file for complete search history.

(56) References Cited

U.S. PATENT DOCUMENTS

| | | | |
|---|---|---|---|
| 7,633,869 B1* | 12/2009 | Morris | H04L 47/22 370/468 |
| 10,244,071 B2 | 3/2019 | Moustafa et al. | |
| 10,257,678 B2 | 4/2019 | Hoseinitabatabaei et al. | |
| 2010/0088670 A1* | 4/2010 | Paster | H04L 43/022 709/224 |
| 2023/0077340 A1* | 3/2023 | Han | H04L 67/51 709/224 |

FOREIGN PATENT DOCUMENTS

| | | |
|---|---|---|
| CN | 101753449 B | 2/2012 |
| CN | 104104538 A | 10/2014 |
| CN | 104731756 A | 6/2015 |
| CN | 104919758 A | 9/2015 |
| CN | 104954354 A | 9/2015 |
| EP | 1988684 A2 | 11/2008 |

* cited by examiner

*Primary Examiner* — Robert M Morlan
(74) *Attorney, Agent, or Firm* — Hanley, Flight & Zimmerman

(57) ABSTRACT

Methods, apparatus, systems and articles of manufacture are disclosed for edge data prioritization. An example apparatus includes at least one memory, instructions, and processor circuitry to at least one of execute or instantiate the instructions to identify an association of a data packet with a data stream based on one or more data stream parameters included in the data packet corresponding to the data stream, the data packet associated with a first priority, execute a model based on the one or more data stream parameters to generate a model output, determine a second priority of at least one of the data packet or the data stream based on the model output, the model output indicative of an adjustment of the first priority to the second priority, and cause transmission of at least one of the data packet or the data stream based on the second priority.

25 Claims, 14 Drawing Sheets

SYSTEMS, APPARATUS, AND METHODS FOR EDGE DATA PRIORITIZATION

FIELD OF THE DISCLOSURE

This disclosure relates generally to edge network environments and, more particularly, to systems, apparatus, and methods for edge data prioritization.

BACKGROUND

Edge network environments (e.g., an Edge, Fog, multi-access edge computing (MEC), or Internet of Things (IoT) network) enable a workload execution (e.g., an execution of one or more computing tasks, an execution of a machine learning model using input data, etc.) near endpoint devices that request an execution of the workload. Edge network environments may include infrastructure, such as an edge service, that is connected to cloud infrastructure, endpoint devices, or additional edge infrastructure via networks such as the Internet. Edge services may be closer in proximity to endpoint devices than cloud infrastructure, such as centralized servers.

DETAILED DESCRIPTION

Figure 1:
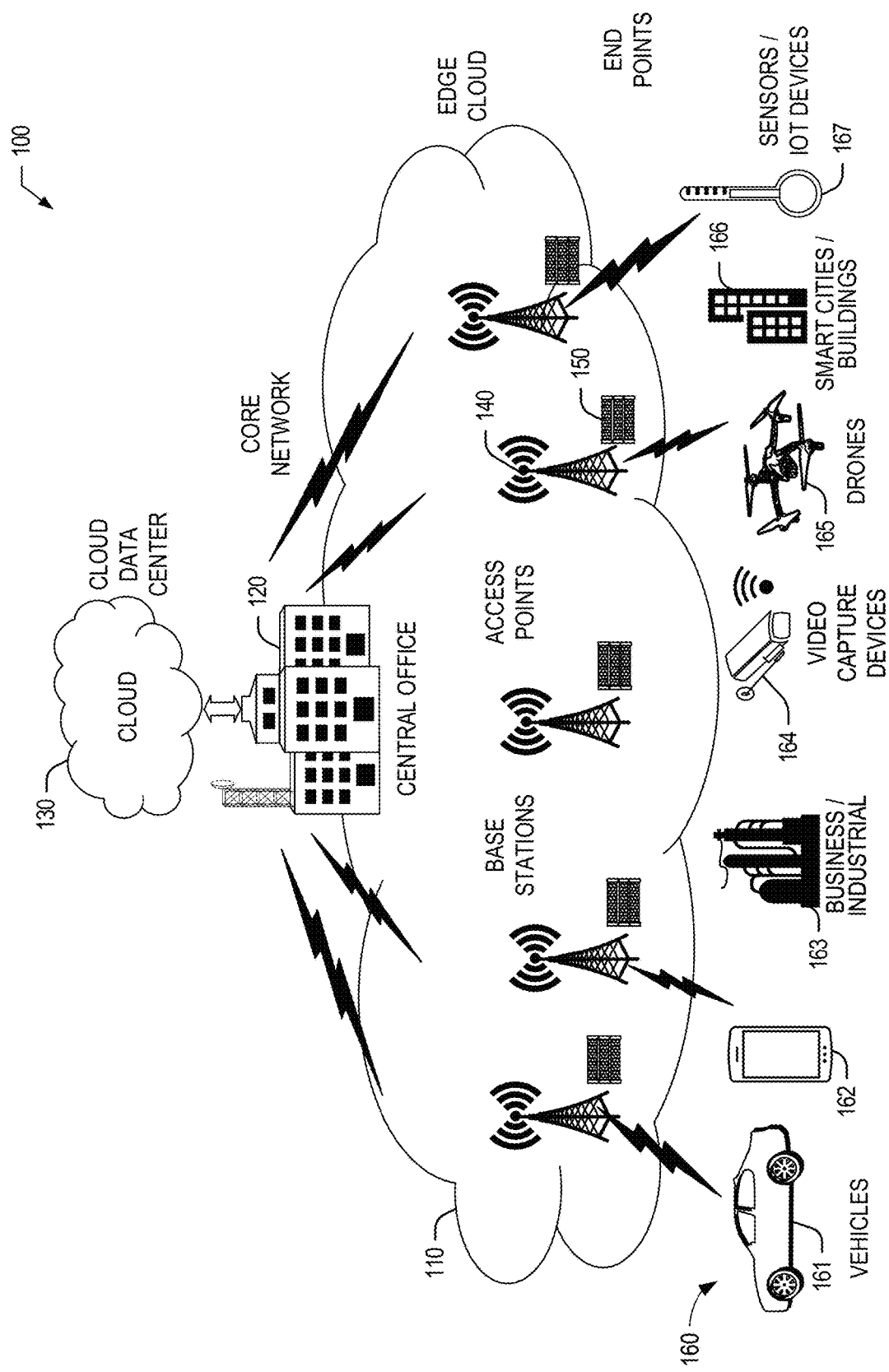
FIG. 1 illustrates an overview of an example edge cloud configuration for edge computing that may implement the examples disclosed herein.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processor circuitry is/are best suited to execute the computing task(s).

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with data privacy or security requirements. Edge computing may, in some scenarios, provide a cloud-like distributed service that offers orchestration and management for applications among many types of storage and compute resources. As a result, some implementations of edge computing have been referred to as the "edge cloud" or the "fog," as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (e.g., devices, hosts, tenants, service providers, operators, etc.) are involved.

In a similar manner, Internet of Things (IoT) networks and devices are designed to offer a distributed compute arrangement from a variety of endpoints. IoT devices can be physical or virtualized objects that may communicate on a network, and can include sensors, actuators, and other input/output components, which may be used to collect data or perform actions in a real-world environment. For example, IoT devices can include low-powered endpoint devices that are embedded or attached to everyday things, such as buildings, vehicles, packages, etc., to provide an additional level of artificial sensory perception of those things. In recent years, IoT devices have become more popular and thus applications using these devices have proliferated.

In some examples, an edge network environment can include an enterprise edge in which communication with and/or communication within the enterprise edge can be facilitated via wireless and/or wired connectivity. The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, latency, processing and network resources, service availability and efficiency, among many other issues. One such challenge is in relation to Edge, Fog, MEC, and IoT networks, devices, and services executing workloads on behalf of endpoint devices.

The present techniques and configurations may be utilized in connection with many aspects of current networking systems, but are provided with reference to Edge Cloud, IoT, MEC, and other distributed computing deployments. The following systems and techniques may be implemented in, or augment, a variety of distributed, virtualized, or managed edge computing systems. These include environments in which network services are implemented or managed using MEC, fourth generation (4G) or fifth generation (5G) wireless network configurations; or in wired network configurations involving fiber, copper, and/or other connections. Further, aspects of processing by the respective computing components may involve computational elements that are in geographical proximity of user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

Edge computing is a developing paradigm where computing is performed at or closer to the "edge" of a network, typically through the use of a computing platform implemented at base stations, gateways, switches, network routers, or other devices that are much closer to endpoint devices producing and consuming the data. For example, edge gateways (e.g., edge gateway servers) may be equipped with pools of memory and storage resources to perform computations in real-time for low latency use-cases (e.g., autonomous driving or video surveillance) for connected client devices. Or as an example, base stations may be augmented with compute and acceleration resources (e.g., compute and accelerator circuitry, firmware and/or software associated with the compute and accelerator circuitry, etc.) to directly process service workloads for connected user equipment, without further communicating data via backhaul networks. Or as another example, central office network management hardware may be replaced with computing hardware that performs virtualized network functions and offers compute resources for the execution of services and consumer functions for connected devices.

Edge environments (e.g., edge network environments) include networks and/or portions of networks that are located between a cloud environment and an endpoint environment. Edge environments enable computations of workloads at edges of a network. For example, an endpoint device may request a nearby base station to compute a workload rather than a central server in a cloud environment. Edge environments include edge services, which include pools of memory, storage resources, and/or processing resources. Edge services perform computations, such as an execution of a workload, on behalf of other edge services and/or edge nodes. Edge environments facilitate connections between producers (e.g., workload executors, edge services, etc.) and consumers (e.g., other edge services, endpoint devices, etc.).

Because edge services may be closer in proximity to endpoint devices than centralized servers in cloud environments, edge services enable computations of workloads with a lower latency (e.g., response time) than cloud environments. Edge services may also enable a localized execution of a workload based on geographic locations or network topographies. For example, an endpoint device may require a workload to be executed in a first geographic area, but a centralized server may be located in a second geographic area. The endpoint device can request a workload execution by an edge service located in the first geographic area to comply with corporate or regulatory restrictions.

Examples of workloads to be executed in an edge environment include autonomous driving computations, autonomous robot control computations, video surveillance monitoring, machine learning model executions, and/or real time data analytics. Additional examples of workloads may include delivering and/or encoding media streams, measuring advertisement impression rates, object detection in media streams, speech analytics, asset and/or inventory management, and/or augmented reality processing.

Edge services enable both the execution of workloads and a return of a result of an executed workload to endpoint devices with a response time lower than the response time of a server in a cloud environment. For example, if an edge service is located closer to an endpoint device on a network than a cloud server, the edge service may respond to workload execution requests from the endpoint device faster than the cloud server. An endpoint device may request an execution of a time-constrained workload from an edge service rather than a cloud server.

In addition, edge services enable the distribution and decentralization of workload executions. For example, an endpoint device may request a first workload execution and a second workload execution. In some examples, a cloud server may respond to both workload execution requests. With an edge environment, however, a first edge service may execute the first workload execution request, and a second edge service may execute the second workload execution request.

To meet the low-latency and high-bandwidth demands of endpoint devices, orchestration in edge clouds has to be performed based on timely resource utilization information about the utilization of many resources (e.g., hardware resources, software resources, virtual hardware and/or software resources, etc.), and the efficiency with which those resources are able to meet the demands placed on them. Some edge environments include thousands or tens of thousands of data sources, endpoint devices, etc., which causes data volumes to be processed and/or computed at the edge devices layer (e.g., a layer including one or more edge devices, such as a switch (e.g., an edge switch), a gateway (e.g., an edge gateway), etc., and/or a combination thereof) of the edge environments. In some such edge environments, substantial infrastructure (e.g., hardware, software, and/or firmware resources) may be needed to maintain low latencies and/or otherwise satisfy latency requirements or thresholds of the edge environments.

Some edge environments may identify redundant data from data sources to maintain low latencies. For example, a source node (e.g., an endpoint device, a source service or platform, etc.) may send data to a destination node (e.g., a server, a target service or platform, etc.) in response to a condition, which may include a substantial change in a moving average of the data. In some such examples, the transmission of data based on conditions to reduce the transmission of redundant data may not be efficient as such conditions may need to be individually identified and configured for each of the data sources. In some such examples, the identification of redundant data may not be implemented because there may not be sufficient resources (e.g., hardware, software, and/or firmware resources) at every data source to identify averages, trends, etc., to implement data filtering.

Some edge environments may deliver data based on deadlines to meet latency requirements associated with a data source. For example, an air pollution sensor, a carbon dioxide sensor, etc., in a factory environment may have first latency requirements that may be satisfied with up to a few seconds of delay (e.g., 2 seconds, 4 seconds, etc.) for transmission from the sensor to a destination node. In some such examples, a preventative maintenance sensor in the factory environment may have second latency requirements (e.g., transmission delays of 10 seconds, 15 seconds, 30 seconds, etc.) that are less stringent than the first latency requirements. In some such examples, a real-time video feed from a video camera may have third latency requirements that are more stringent than the first and second latency requirements and may require the lowest possible latency that the edge infrastructure of the factory environment can facilitate. Some edge environments may satisfy one(s) of the first, second, and/or third latency requirements based on earliest deadline first (EDF) techniques. However, EDF techniques may treat the data from each of the sensors and the video camera as equally important from the perspective of the contents of the data being transmitted. Some such edge environments may not adjust a priority of the data based on the contents of the data but rather determine the priority based on the deadlines of the respective data sources.

Some edge environments may use Quality-of-Service (QoS) techniques to ensure higher priority data achieves lower latency due to reprioritization of traffic at the edge devices layer. Some such edge environments may determine the higher priorities based on the priority of the data source or a tenant associated with the data source. However, such QoS techniques may not adjust a priority of the data based on the contents of the data but rather determine the priority based on the priority of the respective data source or associated tenant. For example, such QoS techniques may determine that a flood of data from the air pollution sensor includes some peaks and valleys within an acceptable range (e.g., an acceptable healthy range) and thereby does not indicate high priority data. In some such examples, if the same air pollution sensor outputs data indicating a massive spike in air pollution not within the acceptable range, the QoS techniques may determine that the data is not high priority data because the QoS techniques may determine the priority of the data based on the source of the data and not based on the content of the data. Some such QoS techniques that determine data priority based on an identifier (ID) of the tenant (e.g., a tenant ID) may determine that the priority of the data indicative of the above-referenced massive spike is not high priority and the use of the tenant ID thereby does not overcome the aforementioned disadvantages of determining data priority based on a priority of the data source, a tenant associated with the data source, etc.

Examples disclosed herein include adaptive packet prioritization based on global observability at the edge. In some disclosed examples, resources of the edge devices layer including edge switches, edge gateways, etc., may implement global observability of data from a plurality of data sources by analyzing and/or inspecting an aggregation of data across ones of the plurality of the data sources to identify changes or trends in data that may affect a priority of the data (or portion(s) thereof).

In some disclosed examples, resources of the edge devices layer may improve an efficiency of transmission of data within an edge environment by observing a deadline (e.g., a data stream or flow deadline) of the data and/or determining an importance or significance of the data based on the contents of the data. In some disclosed examples, the resources of the edge devices layer may determine the importance of the data by inspecting and/or analyzing a header, a payload, etc., of a data packet associated with a data stream from the same source (e.g., a data source, a data producer, etc.) over a window of observability. For example, the window of observability may be implemented based on a number of data packets transmitted by the source and/or a time duration or interval. In some such examples, the resources of the edge devices layer may estimate the importance of the data by executing one or more models (e.g., data relevance or significance models) with data stream parameters associated with the data as model input(s). For example, the data stream parameters may correspond to salient features of interest associated with a data packet and/or a data stream, and the salient features may include a source service or appliance associated with a data packet of a data stream, a target service or appliance associated with the data packet, a data type of a payload of the data packet, etc., and/or a combination thereof. In some examples described herein, a parameter (e.g., a data stream parameter) may be in a numerical or protocol form. For example, the parameter (e.g., the data parameter, etc.) may be in any data format or representation such as, for example, character representation, floating point or real number representation, integer representation, string representation, binary data format, comma delimited data format, tab delimited data format, structured query language (SQL) structures, an executable, etc.

In some examples, the resources of the edge devices layer may execute the one or more models, which may be implemented by one or more artificial intelligence/machine-learning (AI/ML) models, one or more statistical models, one or more comparison models (e.g., one or more bitstream comparison models, one or more binary comparison models, etc.). Advantageously, in some disclosed examples, the resources of edge devices layer may expand an infrastructure of an edge environment by analyzing data streams associated with a service of interest to determine if a priority of data from a source is to be increased or reduced based on the global observed stream of the edge environment.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and Internet-of-Things (IoT) devices 167, etc.) than the cloud data center 130. Compute, memory, and storage resources that are offered at the edges in the edge cloud 110 are critical to providing ultra-low latency response times for services and functions used by the endpoint data sources 160 as well as reducing network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an example edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices, which are much closer to endpoint devices producing and consuming the data. For example, resources of an edge devices layer of the edge environment may include edge switches (e.g., edge switch servers), edge gateways (e.g., edge gateway servers), etc., which may be equipped with pools of memory and storage resources to perform computation in real-time for low latency use-cases (e.g., autonomous driving or video surveillance) for connected client devices. Or as an example, base stations may be augmented with compute and/or acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services that the compute resource will be "moved" to the data, as well as scenarios in which the data will be "moved" to the compute resource. Or as an example, base station compute, acceleration, and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the example network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, a traffic light change, autonomous control of a system (e.g., an air vehicle (e.g., an unmanned aerial vehicle (UAV) or drone), a robot, a vehicle, etc.) etc., and may fail in attempting to meet bandwidth and/or latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (e.g., PHY, media access control (MAC), routing, etc.) data typically changes quickly and is better handled locally in order to meet latency requirements. Higher layer data such as Application Layer data is typically less time critical and may be stored and processed in a remote cloud data-center. At a more generic level, an edge computing system may be described to encompass any number of deployments operating in the edge cloud 110, which provide coordination from client and distributed computing devices.

Figure 2:
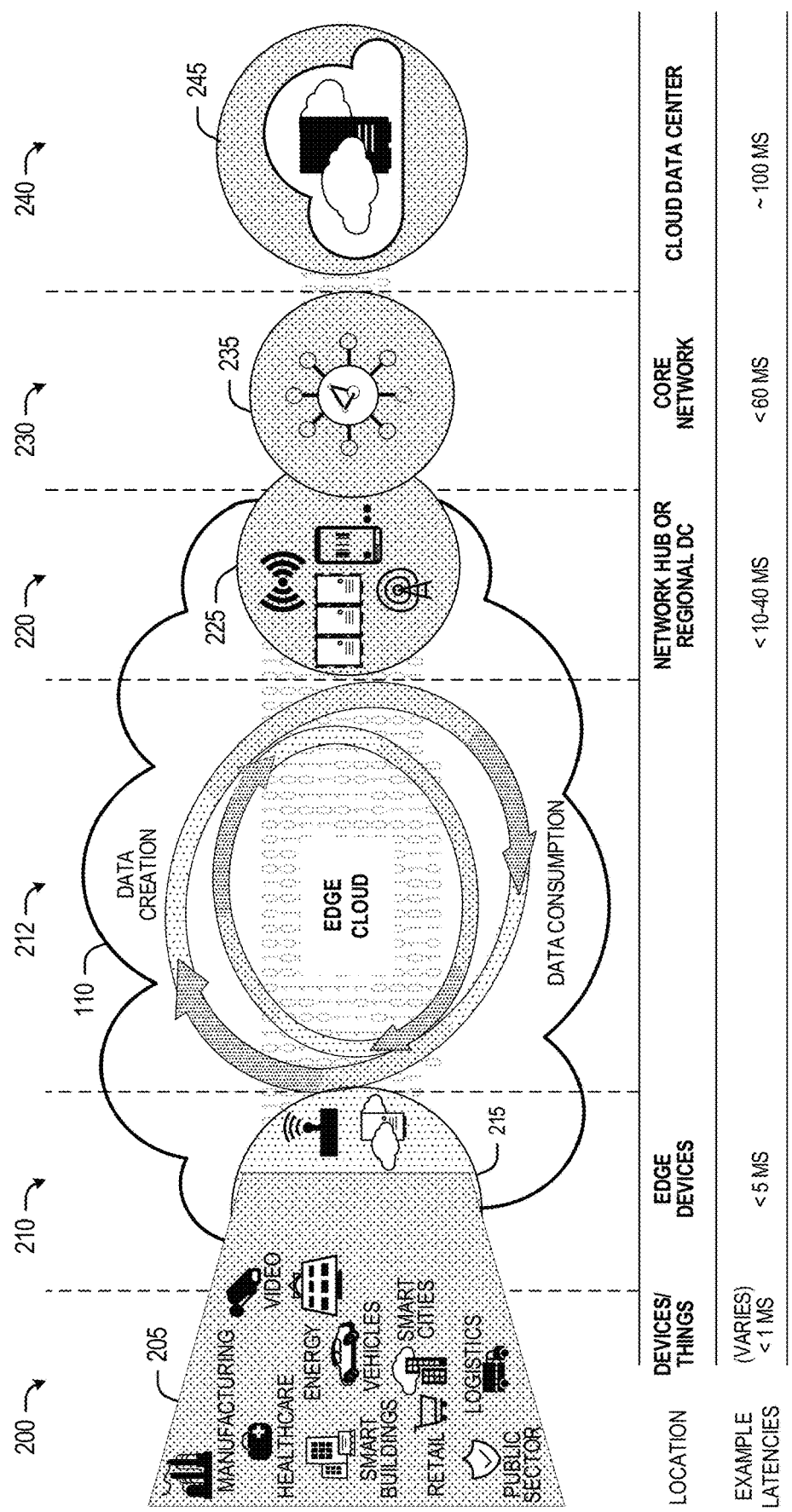
FIG. 2 illustrates operational layers among example endpoints, an example edge cloud, and example cloud computing environments that may implement the examples disclosed herein.

FIG. 2 illustrates operational layers among endpoints, an edge cloud, and cloud computing environments. Specifically, FIG. 2 depicts examples of computational use cases 205, utilizing the edge cloud 110 of FIG. 1 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer 240). As a result, operations at a core network data center 235 or a cloud data center 245, with latencies of at least 50 to 100 ms or more, will not be able to accomplish many time-critical functions of the computational use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or the cloud data center 245, a central office or content data network may be considered as being located within a "near edge" layer ("near" to the cloud, having high latency values when communicating with the devices and endpoints of the computational use cases 205), whereas an access point, base station, on premise server, or network gateway may be considered as located within a "far edge" layer ("far" from the cloud, having low latency values when communicating with the devices and endpoints of the computational use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various computational use cases 205 may access resources under usage pressure from incoming streams, due to multiple services utilizing the edge cloud 110. To achieve results with low latency, the services executed within the edge cloud 110 balance varying requirements in terms of: (a) Priority (throughput or latency) and QoS (e.g., traffic for an autonomous car or a video feed from a video camera may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these computational use cases 205 involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the computational use cases 205 (e.g., object tracking, video surveillance, connected cars, sensor measurement analysis, monitoring and/or control of a process control environment, etc.) in real-time or near real-time, and meet ultra-low latency requirements for these multiple applications. These advantages enable a whole new class of applications (e.g., virtual network functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 210-230), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems, which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" that connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., wireless fidelity (Wi-Fi), long-range wireless, wired networks including optical networks, etc.) may also be utilized in place of or in combination with such Second Generation Partnership Project (2GPP) and/or Third Generation Partnership Project (3GPP) carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC or DC/AC converter(s), power regulators, transformers, charging circuitry, batteries, wired inputs and/or wireless power inputs, etc. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, light emitting diodes (LEDs), speakers, I/O ports (e.g., universal serial bus (USB) ports or inputs), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include IoT devices. The appliance computing device may include hardware and software components to manage local issues such as device temperature, vibration, resource utilization, updates, power issues, physical and network security, etc. The example processor systems of at least FIGS. 11 and/or 12 illustrate example hardware for implementing an appliance computing device. The edge cloud 110 may also include one or more servers and/or one or more multi-tenant servers. Such a server may include an operating system and a virtual computing environment. A virtual computing environment may include a hypervisor managing (e.g., spawning, deploying, destroying, etc.) one or more virtual machines (VMs), one or more containers, etc. Such virtual computing environments provide an execution environment in which one or more applications and/or other software, code or scripts may execute while being isolated from one or more other applications, software, code, or scripts.

Figure 3:
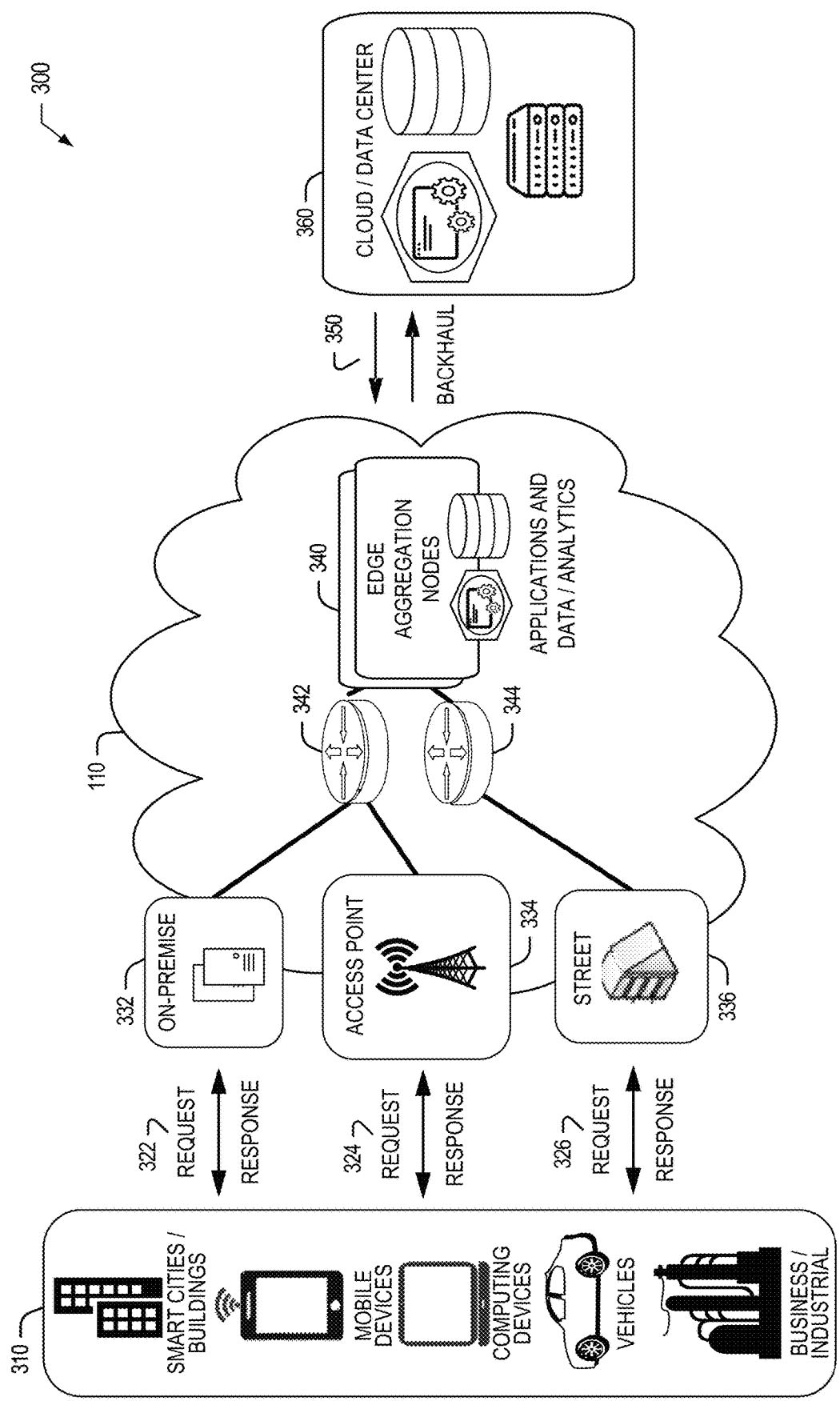
FIG. 3 illustrates an example approach for networking and services in an edge computing system that may implement the examples disclosed herein.

In FIG. 3, an example edge computing system 300 includes various client endpoints 310 (in the form of mobile devices (e.g., mobile computing devices), computing devices (e.g., computers), vehicles (e.g., autonomous vehicles), business computing equipment, industrial processing computing equipment) exchange requests and responses 322, 324, 326 that are specific to the type of endpoint network aggregation. For instance, the client endpoints 310 may obtain network access via a wired broadband network, by exchanging first example requests and responses 322 through an example on-premise network system 332. Some of the client endpoints 310, such as mobile devices, may obtain network access via a wireless broadband network, by exchanging second example requests and responses 324 through an example access point (e.g., cellular network tower) 334. Some of the client endpoints 310, such as autonomous vehicles may obtain network access for third example requests and responses 326 via a wireless vehicular network through an example street-located network system 336. However, regardless of the type of network access, the TSP may deploy example aggregation points 342, 344 within the edge cloud 110 of FIGS. 1 and/or 2 to aggregate traffic and requests. Thus, within the edge cloud 110, the TSP may deploy various compute and storage resources, such as at example edge aggregation nodes 340, to provide requested content. The edge aggregation nodes 340 and other systems of the edge cloud 110 are connected to an example cloud or data center 360, which uses an example backhaul network 350 to fulfill higher-latency requests from the cloud/data center 360 for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
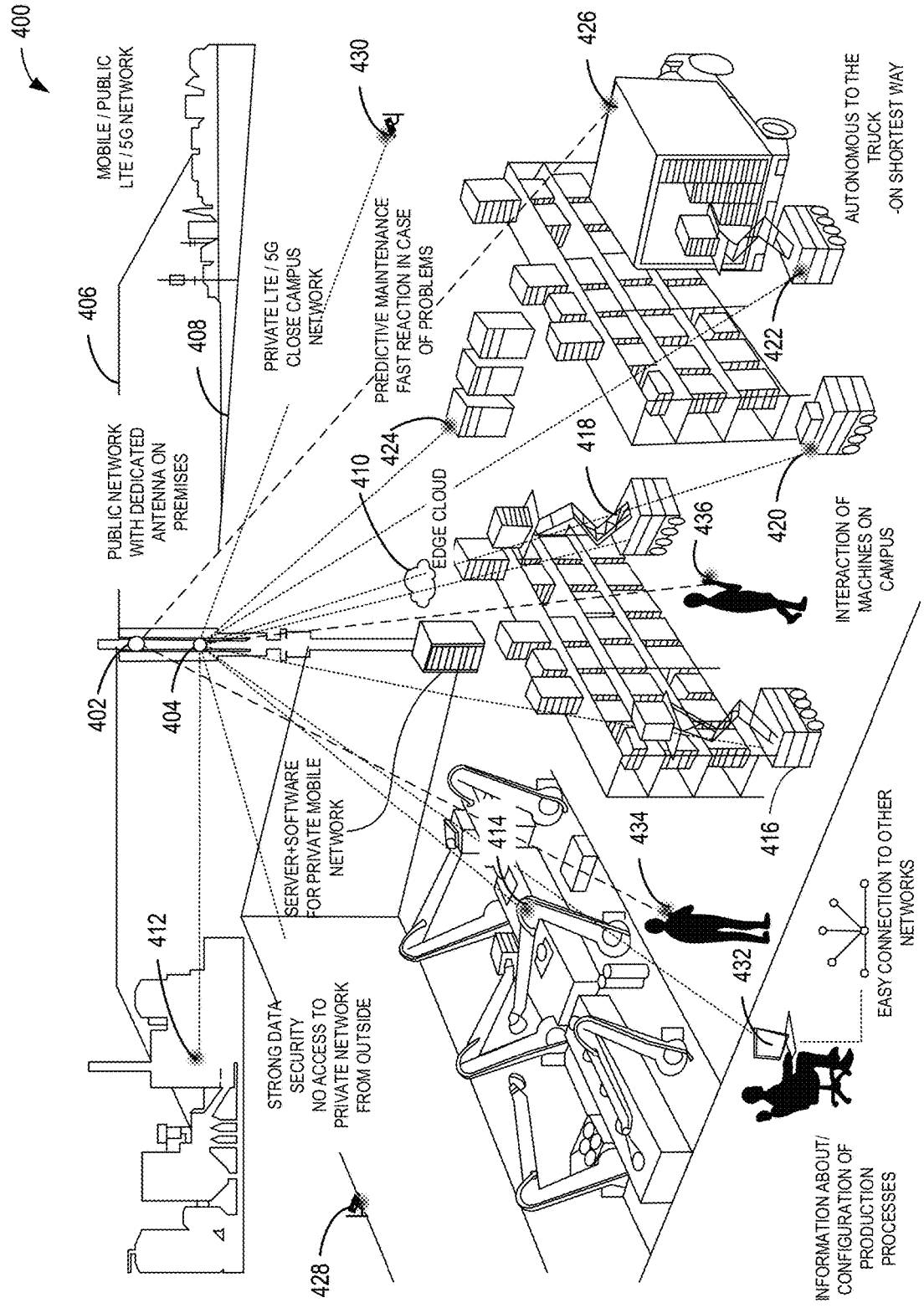
FIG. 4 is an illustration of an example edge network environment including an example edge gateway and an example edge switch that may implement example edge data prioritization as disclosed herein.

FIG. 4 is an illustration of an example edge network environment 400 including an example edge gateway 402 and an example edge switch 404 that may implement example edge data prioritization as disclosed herein. In some examples, the edge gateway 402 and/or the edge switch 404 may implement resources of the edge devices layer 210 of FIG. 2. In some such examples the edge gateway 402 and/or the edge switch 404 may implement the access point or base station 140 of FIG. 1, the local processing hub 150 of FIG. 1, and/or the nodes 215 of FIG. 2. For example, the edge gateway 402 and/or the edge switch 404 may implement the edge devices layer 210 of FIG. 2.

The edge network environment 400 of the illustrated example includes an example public network 406, an example private network 408, and an example edge cloud 410. In this example, the public network 406 may implement a TSP network (e.g., a Long-Term Evolution (LTE) network, a 5G network, etc.). For example, the public network 406 may implement the network access layer 220 of FIG. 2, the core network 230 of FIG. 2, and/or the cloud data center layer 240 of FIG. 2. In this example, the private network 408 may implement an enterprise network (e.g., a close campus network, a private LTE network, a private 5G network, etc.). For example, the private network 408 may implement the endpoint layer 200 of FIG. 2 and/or the edge devices layer 210 of FIG. 2. In some examples, the edge cloud 410 may be implemented by one or more hardware, software, and/or firmware resources. For example, the edge cloud 410 may be implemented by one or more computer servers. In this example, the edge cloud 410 may implement an enterprise edge cloud. For example, the edge cloud 410 may implement the edge cloud 110 of FIGS. 1, 2, and/or 3.

In the illustrated example of FIG. 4, the edge network environment 400 may implement a smart factory (e.g., a smart industrial factory), a process control environment, etc. For example, the edge network environment 400 may implement one(s) of the computational use cases 205 of FIG. 2, such as a manufacturing, smart building, logistics, vehicle, and/or video computational use cases.

The edge network environment 400 of the illustrated example includes an example process control system 412, example robots (e.g., collaborative robots, robot arms, etc.) 414, a first example industrial machine (e.g., an autonomous industrial machine) 416, a second example industrial machine 418, a third example industrial machine 420, a fourth example industrial machine 422, an example predictive maintenance system 424, an example vehicle (e.g., a truck, an autonomous truck, an autonomous vehicle, etc.) 426, a first example monitoring sensor 428, a second example monitoring sensor 430, and example endpoint devices 432, 434, 436. In some examples, the process control system 412 may include one or more industrial machines such as a silo, a smokestack, a conveyor belt, a mixer, a pump, etc., and/or a combination thereof. For example, the process control system 412 may implement the business and industrial equipment 163 of FIG. 1, the smart cities and building devices 166 of FIG. 1, etc.

In some examples, the robots 414 may implement hydraulic and/or electromechanical robots that may be configured to execute manufacturing tasks (e.g., lifting equipment, assembling components, etc.), industrial tasks, etc. For example, the robots 414 may implement the business and industrial equipment 163 of FIG. 1, the smart cities and building devices 166 of FIG. 1, etc. In some examples, the industrial machines 416, 418, 420, 422 are autonomous machines, such as autonomous forklifts, scissor lifts, etc. For example, the industrial machines 416, 418, 420 may implement the business and industrial equipment 163 of FIG. 1, the drones 165 of FIG. 1, the smart cities and building devices 166 of FIG. 1, etc. In some examples, the predictive maintenance system 424 may implement one or more computing devices, servers, etc., that identify maintenance alerts, fault predictions, etc., associated with equipment of the edge network environment 400 based on sensor data (e.g., prognostic health data). For example, the predictive maintenance system 424 may implement the business and industrial equipment 163 of FIG. 1, the smart cities and building devices 166 of FIG. 1, the sensors and IoT devices 167 of FIG. 1, etc.

In some examples, the vehicle 426 may implement one of the autonomous vehicles 161 of FIG. 1. In some examples, the first monitoring sensor 428 and/or the second monitoring sensor 430 are video cameras. For example, the first monitoring sensor 428 and/or the second monitoring sensor 430 may implement the business and industrial equipment 163 of FIG. 1, the video capture devices 164 of FIG. 1, the smart cities and building devices 166 of FIG. 1, the sensors and IoT devices 167 of FIG. 1, etc. Alternatively, the first monitoring sensor 428 and/or the second monitoring sensor 430 may implement a thermal camera (e.g., an infrared camera), an air pollution sensor, a carbon dioxide sensor, a temperature sensor, a humidity sensor, an air pressure sensor, etc., or any other type of sensor.

In this example, the endpoint devices 432, 434, 436 include a first example endpoint device 432, a second example endpoint device 434, and a third example endpoint device 436. In some examples, one(s) of the endpoint devices 432, 434, 436 may implement consumer computing devices, user equipment, etc. For example, one or more of the endpoint devices 432, 434, 436 may implement the user equipment 162 of FIG. 1. In some such examples, one or more of the endpoint devices 432, 434, 436 may be implemented by a smartphone, a tablet computer, a desktop computer, a laptop computer, a wearable device (e.g., a headset or headset display, an augmented reality (AR) headset, a smartwatch, smart glasses, etc.), etc.

In the illustrated example of FIG. 4, the edge gateway 402 may facilitate communication between different networks, such as communication from a source service, a source appliance, etc., of the public network 406 to a target service, a target appliance, etc., of the private network 408. For example, the edge gateway 402 may receive a data stream including one or more data packets from a source (e.g., a data source), a producer (e.g., a data producer), etc. In some such examples, the edge gateway 402 may receive the data stream from the vehicle 426, the second endpoint device 434, the third endpoint device 436, etc., to be transmitted to a target service, a target appliance, etc., which may be implemented by the cloud data center 130 of FIG. 1, the cloud data center 245 of FIG. 2, the cloud or data center 360 of FIG. 3, etc.

In some examples, the edge gateway 402 may facilitate communication between a source service, a source appliance, etc., of the private network 408 to a target service, a target appliance, etc., of the public network 406. For example, the edge gateway 402 may receive a data stream including one or more data packets from a source (e.g., a data source), a producer (e.g., a data producer), etc., which may be implemented by the cloud data center 130 of FIG. 1, the cloud data center 245 of FIG. 2, the cloud or data center 360 of FIG. 3, etc. In some such examples, the edge gateway 402 may receive the data stream from the cloud data center 130 of FIG. 1, the cloud data center 245 of FIG. 2, the cloud or data center 360 of FIG. 3, etc., to be transmitted to the vehicle 426, the second endpoint device 434, the third endpoint device 436, etc.

In the illustrated example of FIG. 4, the edge switch 404 may facilitate communication between different sources and targets within a network, such as communication from a source service, a source appliance, etc., of the private network 408 to a target service, a target appliance, etc., of the private network 408. For example, the edge switch 404 may receive a data stream from the edge gateway 402, the edge cloud 410, the process control system 412, one(s) of the robots 414, one(s) of the industrial machines 416, 418, 420, 422, the predictive maintenance system 424 (or sensor(s) thereof), the first monitoring sensor 428, the second monitoring sensor 430, the first endpoint device 432, the second endpoint device 434, the third endpoint device 436, etc. In some such examples, the edge switch 404 may transmit the data stream to a destination within the private network 408. For example, the edge switch 404 may transmit the data stream to at least one of the edge gateway 402, the edge cloud 410, the process control system 412, one(s) of the robots 414, one(s) of the industrial machines 416, 418, 420, 422, the predictive maintenance system 424 (or sensor(s) thereof), the vehicle 426, the first monitoring sensor 428, the second monitoring sensor 430, the first endpoint device 432, the second endpoint device 434, or the third endpoint device 436.

In some examples, the edge gateway 402 and/or the edge switch 404 implement adaptive packet prioritization based on global observability at the edge, which may be implemented by the edge network environment 400 or portion(s) thereof. In some examples, the edge network environment 400 implements a large number and/or different types of applications, such as machine vision applications implemented by the robots 414, autonomous driving applications implemented by the vehicle 426, etc. In some such examples, the data generated by the private network 408 is relatively diverse because of the vast range of data sources, such as sensors, controllers, services, and/or user input that may be processed and analyzed to identify anomalies and trends in the data. For example, the edge gateway 402 and/or the edge switch 404 may facilitate the transmission of data including sensor data or measurements, video feeds, still images, predictive maintenance alerts or control commands, robotic control commands, etc., and/or a combination thereof.

In some examples, the edge gateway 402 and/or the edge switch 404 may execute data relevance models for all or a substantial portion of all of the data packets in the edge network environment 400. In some examples, there are a plurality of the edge gateways 402 and/or a plurality of the edge switches 404 in the edge network environment 400. The data relevance models may be executed in multiple places of the edge network environment 400 (e.g., by ones of the edge gateways 402, the edge switches 404, etc.). In some examples, the different ones of the edge gateways 402, the edge switches 404, etc., may have more or less observability based on the data that they process and/or otherwise encounter. Accordingly, two different ones of the edge switches 404 may develop, train, and/or otherwise generate different one(s) of the data relevance models based on the data processed by each of the two different ones of the edge switches 404. For example, a first one of the edge switches 404 may observe 10% of the edge network environment 400 and a second one of the edge switches 404 may observe 90% of the edge network environment 400, which may become the basis for the differences in the data relevance models executed by the first and second one of the edge switches 404. In some such examples, the first one of the edge switches 404 may transmit and/or otherwise propagate model outputs from its data relevance models to the second one of the edge switches 404. In some such examples, the second one of the edge switches 404 may transmit and/or otherwise propagate model outputs from its data relevance models to the first one of the edge switches 404.

In some examples, data generated by the private network 408 may be immense. In some examples, a data source, such as the process control system 412, one(s) of the robots 414, one(s) of the industrial machines 416, 418, 420, 422, the predictive maintenance system 424 (or sensor(s) thereof), the vehicle 426, the first monitoring sensor 428, the second monitoring sensor 430, the first endpoint device 432, the second endpoint device 434, and/or the third endpoint device 436, may have insufficient computing resources (e.g., one or more processors, one or more accelerators, one or more memories, one or more mass storage discs, etc.) to analyze the data generated by the data source. In some such examples, the data source may be unable to identify redundant data, less important or less significant data, etc., due to insufficient computing resources and therefore may flood the private network 408 with a significant quantity of data at relatively short intervals. Advantageously, the edge gateway 402 and/or the edge switch 404 may identify a priority of data to be transmitted based on a content and/or a context of the data.

Figure 5:
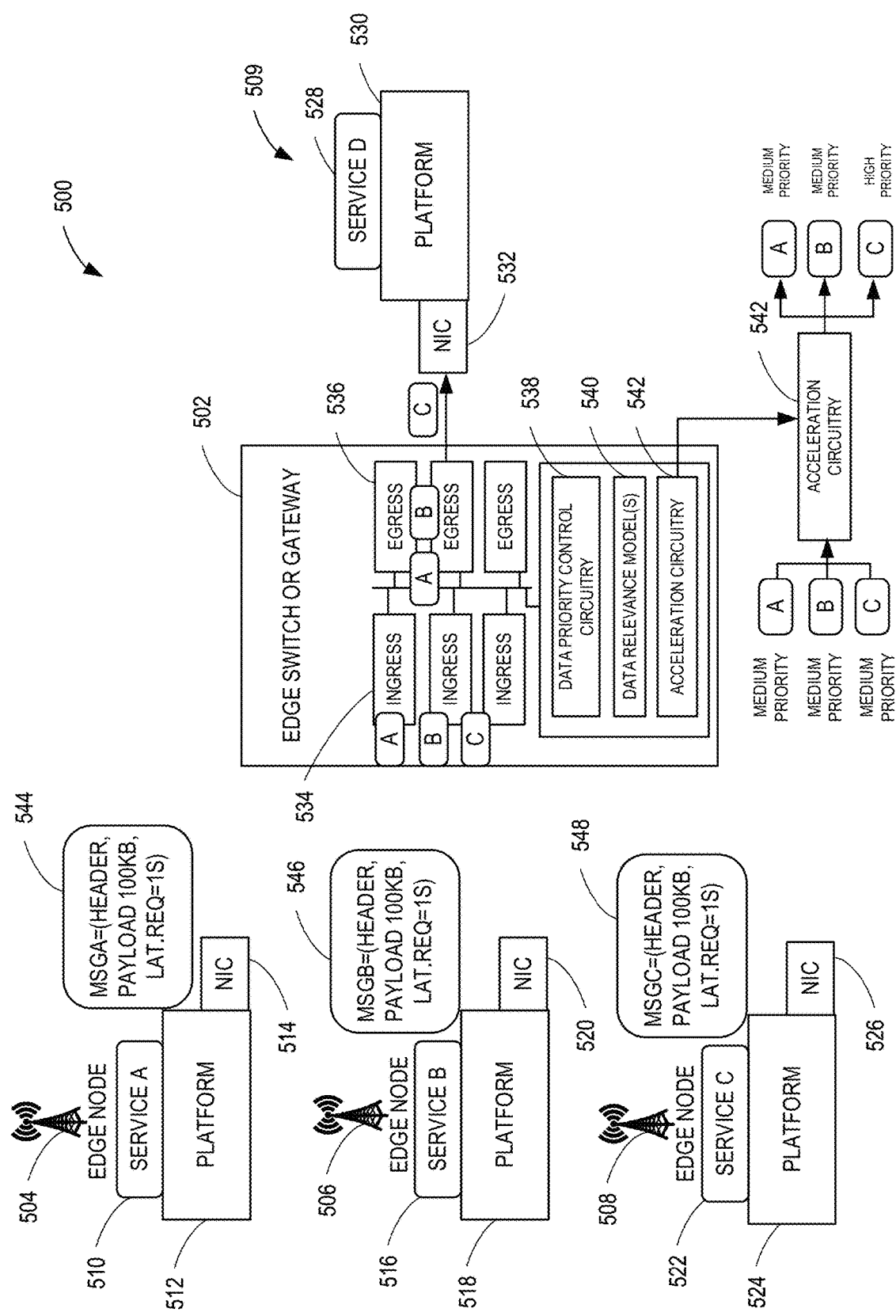
FIG. 5 depicts an example implementation of the example edge network environment, the example edge gateway, and/or the example edge switch of FIG. 4, which includes example data priority control circuitry.

FIG. 5 depicts an example edge network environment 500 including example edge circuitry 502. In some examples, the edge network environment 500 may be an example implementation of one or more of the layers 200-220 of FIG. 2, the edge computing system 300 of FIG. 3, and/or the edge network environment 400 of FIG. 4. In some examples, the edge circuitry 502 may implement an edge interface resource, such as an edge gateway and/or an edge switch.

For example, the edge circuitry 502 may implement the edge gateway 402 of FIG. 4 and/or the edge switch 404 of FIG. 4.

The edge network environment 500 includes example edge nodes 504, 506, 508 including a first example edge node 504, a second example edge node 506, a third example edge node 508, and an example compute node 509. In some examples, the compute node 509 may implement an edge node, a cloud or data center, an edge cloud, etc. In some examples, one(s) of the edge nodes 504, 506, 508 and/or the compute node 509 may implement one(s) of the endpoint data sources 160 of FIG. 1, one(s) of the computational use cases 205 of FIG. 2, one(s) of the client endpoints 310 of FIG. 3, the process control system 412, one(s) of the robots 414, one(s) of the industrial machines 416, 418, 420, 422, the predictive maintenance system 424 (or sensor(s) thereof), the vehicle 426, the first monitoring sensor 428, the second monitoring sensor 430, the first endpoint device 432, the second endpoint device 434, and/or the third endpoint device 436 of FIG. 4. In some such examples, the first edge node 504 may implement the first industrial machine 416, the second edge node 506 may implement the first monitoring sensor 428, and the third edge node 508 may implement the first endpoint device 432. In some examples, the compute node 509 may implement the cloud data center 130 of FIG. 1, a component of the edge network environment 400 of FIG. 4 (e.g., the edge cloud 410, the second industrial machine 418, the second endpoint device 434, etc.), etc.

In the illustrated example, the first edge node 504 includes a first example service (SERVICE A) 510, a first example platform 512, and a first example network interface card (NIC) 514. In this example, the second edge node 506 includes a second example service (SERVICE B) 516, a second example platform 518, and a second example NIC 520. In this example, the third edge node 508 includes a third example service (SERVICE C) 522, a third example platform 524, and a third example NIC 526. In this example, the compute node 509 includes a fourth example service (SERVICE D) 528, a fourth example platform 530, and a fourth example NIC 532.

In some examples, the first service 510, the second service 516, the third service 522, and/or the fourth service 528 may correspond to one or more applications implemented by software and/or firmware. In some examples, the first platform 512, the second platform 518, the third platform 524, and/or the fourth platform 530 may be implemented by hardware, software, and/or firmware. For example, the first platform 512, the second platform 518, the third platform 524, and/or the fourth platform 530 may be implemented by one or more Systems on a Chip (SoCs). In some such examples, the SoCs may include central processor units (CPUs), memory, input/output ports and secondary storage, all on the same substrate. Depending on the application, the SoCs may include digital, analog, mixed-signal, radio frequency (RF), or other signal processing functions. Additionally or alternatively, the first platform 512, the second platform 518, the third platform 524, and/or the fourth platform 530 may be implemented by one or more analog or digital circuit(s), logic circuits, programmable processor(s), programmable controller(s), graphics processor unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) (e.g., field programmable gate array(s) (FPGA(s))).

In the illustrated example of FIG. 5, the first NIC 514, the second NIC 520, the third NIC 526, and/or the fourth NIC 532 may be hardware, software, and/or firmware implemented by any type of interface standard, such as an Ethernet interface, a universal serial bus (USB), a Bluetooth® interface, a near field communication (NFC) interface, a Wi-Fi interface, a Peripheral Component Interconnect (PCI) interface, and/or a Peripheral Component Interconnect express (PCIe) interface. For example, the first NIC 514, the second NIC 520, the third NIC 526, and/or the fourth NIC 532 may be hardware, software, and/or firmware that implements a communication device such as a transmitter, a receiver, a transceiver, a modem, a gateway (e.g., a residential, commercial, or industrial gateway), a wireless access point, and/or a network interface to facilitate exchange of data with external machines (e.g., computing devices of any kind).

In the illustrated example of FIG. 5, the edge circuitry 502 includes example ingress ports 534 and example egress ports 536. In some examples, the ingress ports 534 may be configured to receive data from one(s) of the edge nodes 504, 506, 508. In some examples, the egress ports 536 may be configured to transmit data to the compute node 509. In some examples, the ingress ports 534 and/or the egress ports 536 may be physical and/or virtualized jacks, sockets, etc., implemented by hardware, software, and/or firmware. Although only three of the ingress ports 534 and three of the egress ports 536 are depicted in FIG. 5, alternatively, there may be fewer or more than the ingress ports 534 and the egress ports 536 illustrated in this example.

In the illustrated example of FIG. 5, the edge circuitry 502 includes and/or otherwise implements example data priority control circuitry 538. In some examples, the data priority control circuitry 538 may determine a priority (e.g., an order of priority) of data received from one(s) of the edge nodes 504, 506, 508 to be transmitted to the compute node 509 (or a different node or computing resource).

In the illustrated example of FIG. 5, the data priority control circuitry 538 includes and/or otherwise implements example data relevance model(s) 540 and example acceleration circuitry 542. In some examples, the data relevance model(s) 540 may include one or more data relevance models, which may be implemented by one or more AI/ML models, one or more statistical models, one or more comparison models, etc., and/or a combination thereof. For example, the data relevance model(s) 540 may inspect data from one(s) of the edge nodes 504, 506, 508 and determine a level of importance or significance of the data based on the content (e.g., a header, a payload, etc.) of the data. In some examples, the acceleration circuitry 542 may include one or more hardware, software, and/or firmware accelerators. For example, the acceleration circuitry 542 may be implemented by one or more GPUs, one or more AI/ML accelerators, one or more DSPs, one or more ASICs, one or more PLDs, one or more FPLDs, etc., and/or a combination thereof. In some examples, the acceleration circuitry 542 may implement a trusted execution environment (TEE), a sandbox, etc., in which to execute encrypted data included in the messages 544, 546, 548.

In the illustrated example of FIG. 5, the first edge node 504 may generate and transmit a first example message (designated as either MSGA or A) 544 to a first one of the ingress ports 534. In this example, the second edge node 506 may generate and transmit a second example message (designated as either MSGB or B) 546 to a second one of the ingress ports 534. In this example, the third edge node 508 may generate and transmit a third example message (designated as either MSGC or C) 548 to a third one of the ingress ports 534. In this example, the first message 544, the second message 546, and the third message 548 implement a data packet including a header, a payload (e.g., a data payload) of 100 kilobytes (KB), and a corresponding latency requirement of 1 second (s). Alternatively, one or more of the first message 544, the second message 546, and/or the third message 548 may have a different payload size and/or a different latency requirement.

In example operation, the services 510, 516, 522 are each transmitting a 100 KB payload with a latency requirement of 1 second to the fourth service 528. For example, the first service 510 may implement a video feed (e.g., a video feed from the first monitoring sensor 428 of FIG. 4, the second monitoring sensor 430 of FIG. 4, etc.) that looks for surveillance activity in a given area. In some examples, the second service 516 may implement an air pollution sensor (e.g., the first monitoring sensor 428 of FIG. 4, the second monitoring sensor 430 of FIG. 4, etc.) that transmits sensor measurements of carbon dioxide levels associated with an enclosed area. In some examples, the third service 522 may implement a predictive maintenance application (e.g., an application that may be implemented by the predictive maintenance system 424 of FIG. 4) that identifies a potential need for intervention in a mission critical system (or a non-mission critical system).

In example operation, a second one of the egress ports 536 has three egress queues or slots. The second one of the egress ports 536 may correspond to a destination implemented by the fourth service 528. In some examples, each of the messages 544, 546, 548 may have equal priority from a QoS and/or tenant ID perspective. For example, a tenant ID of respective ones of the services 510, 516, 522, etc., may have the same priority and thereby the corresponding ones of the messages 544, 546, 548 have the same priority based on tenant ID priority. In some examples, each of the messages 544, 546, 548 may have the same priority based on each one of the messages 544, 546, 548 having the same latency requirement of 1 second. In some examples, the three slots of the second one of the egress ports 536 are occupied by sources A, B, and C until they are cleared and/or otherwise transmitted to the destination.

In some such examples, such a scheme may prevent all other sources (e.g., a source other than the services 510, 516, 522 of FIG. 5) from using the second one of the egress ports 536 including traffic, data streams, etc., from different sources to a different destination than the fourth service 528, but nonetheless may be mapped to the second one of the egress ports 536. In some such examples, the traffic, the data streams, etc., from the different sources may include data with a lower or substantially equal latency requirement. Advantageously, given the existence of competing data sources and the need for prioritization of the egress ports 536 for data streams having lower latencies, examples described herein may adjust a priority at the edge circuitry 502 based on content of the data.

In example operation, the edge circuitry 502 may determine a priority of respective ones of the messages 544, 546, 548 based on a QoS perspective (e.g., a latency requirement, a deadline or deadline requirement, etc.) and/or a tenant ID (e.g., an identifier of respective ones of the services 510, 516, 522, etc.). For example, the edge circuitry 502 may determine that the first message 544 has a first priority, the second message 546 has a second priority, and the third message 548 has a third priority, which one or more of the priorities may be the same or different.

In example operation, the data priority control circuitry 538 may intercept one(s) of the messages 544, 546, 548. The data priority control circuitry 538 may determine that the first message 544 corresponds to a first data stream representative of communication between a first source, such as the first service 510, the first platform 512, and/or, more generally, the first edge node 504, and a first destination, such as the fourth service 528, the fourth platform 530, and/or, more generally, the fourth edge node 509. The data priority control circuitry 538 may determine that the second message 546 corresponds to a second data stream representative of communication between a second source, such as the second service 516, the second platform 518, and/or, more generally, the second edge node 506, and a second destination, such as the fourth service 528, the fourth platform 530, and/or, more generally, the fourth edge node 509. The data priority control circuitry 538 may determine that the third message 548 corresponds to a third data stream representative of communication between a third source, such as the third service 522, the third platform 524, and/or, more generally, the third edge node 508, and a third destination, such as the fourth service 528, the fourth platform 530, and/or, more generally, the fourth edge node 509.

In some examples, the data priority control circuitry 538 may determine that the first data stream, the second data stream, and/or the third data stream is associated with one or more of the data relevance models 540. In some examples, the first data stream has first data stream parameters, the second data stream has second data stream parameters, and the third data stream has third data stream parameters. For example, the first data stream parameters, the second data stream parameters, and/or the third data stream parameters may include a stream definition, one or more data relevance models, a data type, a source service, a source appliance, a target service, a target appliance, a tenant ID, a payload, etc.

In some examples, the data priority control circuitry 538 may determine that the first data stream has a corresponding AI/ML model. In some such examples, the data priority control circuitry 538 may instruct the acceleration circuitry 542 to execute the AI/ML model with one(s) of the first data stream parameters as model input(s) to generate model output(s), which may be provided to the data priority control circuitry 538. For example, the acceleration circuitry 542 may execute a neural network using the one(s) of the first data stream parameters as model input(s) to identify an individual or group of persons in the video feed. In some such examples, the data priority control circuitry 538 may determine that the priority of the first message 544 is relatively high or the first priority should be increased in response to detecting unidentified person(s) based on the model output(s). In some such examples, the data priority control circuitry 538 may adjust the first priority to ensure that the first message 544 meets an expected deadline or satisfies a latency requirement.

In some examples, the data priority control circuitry 538 may determine that the second data stream has a corresponding statistical model. In some such examples, the data priority control circuitry 538 may instruct the acceleration circuitry 542 to execute the statistical model with one(s) of the second data stream parameters as model input(s) to generate model output(s). For example, the data priority control circuitry 538 may determine that a value of a carbon dioxide measurement from the air pollution sensor is expected or has deviated beyond an expected range based on the model output(s). In some such examples, the acceleration circuitry 542 may execute the statistical model by utilizing the carbon dioxide measurement included in the payload of the second message 546 as a model input. The data priority control circuitry 538 may determine that the priority of the second message 546 is relatively low because the carbon dioxide measurement is as expected based on the time of day, an operation currently ongoing in the edge network environment 400, etc., based on the model output(s). The acceleration circuitry 542 may generate the model output(s) by comparing a standard deviation to a running average (e.g., a simple moving average, an exponential moving average, etc.). In some such examples, the data priority control circuitry 538 may determine that the priority of the second message 546 is relatively low or the second priority should be decreased or remain the same in response to detecting typical, normal, or conventional carbon dioxide measurements based on the model output(s). In some such examples, the data priority control circuitry 538 may adjust the second priority to ensure that the second message 546 meets an expected deadline or satisfies a latency requirement.

In some examples, the data priority control circuitry 538 may determine that the third data stream has a corresponding comparison. In some such examples, the data priority control circuitry 538 may cause, direct, and/or otherwise instruct the acceleration circuitry 542 to execute the comparison model with one(s) of the third data stream parameters as model input(s) to generate model output(s). For example, the acceleration circuitry 542 may execute a comparison model to compare a bit stream of a payload of to a known bit stream, a binary value in a payload to a known binary value, etc., to identify a deviation in the bit stream, the binary value, etc. In some such examples, the acceleration circuitry 542 may compare a first bit stream included in a payload of the third message 548 to a second bit stream and/or a third bit stream, which may be known or stored bit stream(s) in the data priority control circuitry 538, the acceleration circuitry 542, and/or, more generally, the edge circuitry 502. In some such examples, the second bit stream may include one or more bits having respective values that may indicate a normal, non-alert, non-alarm, etc., scenario, situation, or condition while the third bit stream may include one or more bits having respective values that may indicate an abnormal, alert, alarm, etc., scenario, situation, or condition. In some such examples, the data priority control circuitry 538 may determine that the predictive maintenance system 424 generated an alert indicative of a predicted or identified maintenance issue associated with a component of the edge network environment 400 of FIG. 4, and the determination may be based on a comparison of the first bit stream and one(s) of the second bit stream and/or the third bit stream.

In some examples, the data priority control circuitry 538 may determine that the priority of the third message 548 is relatively high or the third priority should be increased in response to detecting an abnormal or alert condition based on the model output(s) from the acceleration circuitry 542. In some examples, the data priority control circuitry 538 may determine that the priority of the third message 548 is relatively low or the third priority should be decreased or maintained the same in response to detecting a normal or non-alert condition based on the model output(s). In some such examples, the data priority control circuitry 538 may adjust the third priority to ensure that the third message 548 meets an expected deadline or satisfies a latency requirement.

In example operation, the data priority control circuitry 538 may determine that the first message 544, the second message 546, and the third message 548 have the same priority (e.g., a medium priority) based on QoS requirements and/or a tenant ID of the respective source services 510, 516, 522. Advantageously, the data priority control circuitry 538 may execute the data relevance model(s) 540 to determine the relevance of the data included in the messages 544, 546, 548 with respect to a current or instant priority that the messages 544, 546, 548 have. Advantageously, the data priority control circuitry 538 may determine that the third message 548 has a high priority based on the content and/or associated data stream parameters of the third message 548. For example, the data priority control circuitry 538 may determine that the third message 548 and/or the third data stream is a critical function because the third message 548 and/or subsequent messages of the third data stream may indicate an anomaly or other condition that may require attention. In example operation, the data priority control circuitry 538 may instruct the second one of the egress ports 536 to transmit the third message 548 at a higher priority compared to an initial determined priority for the third message 548. In some examples, the second one of the egress ports 536 may transmit the third message 548 prior to the first message 544 and/or the second message 546 based on the determined heightened priority in response to the execution of the corresponding data relevance model(s) 540.

Figure 6:
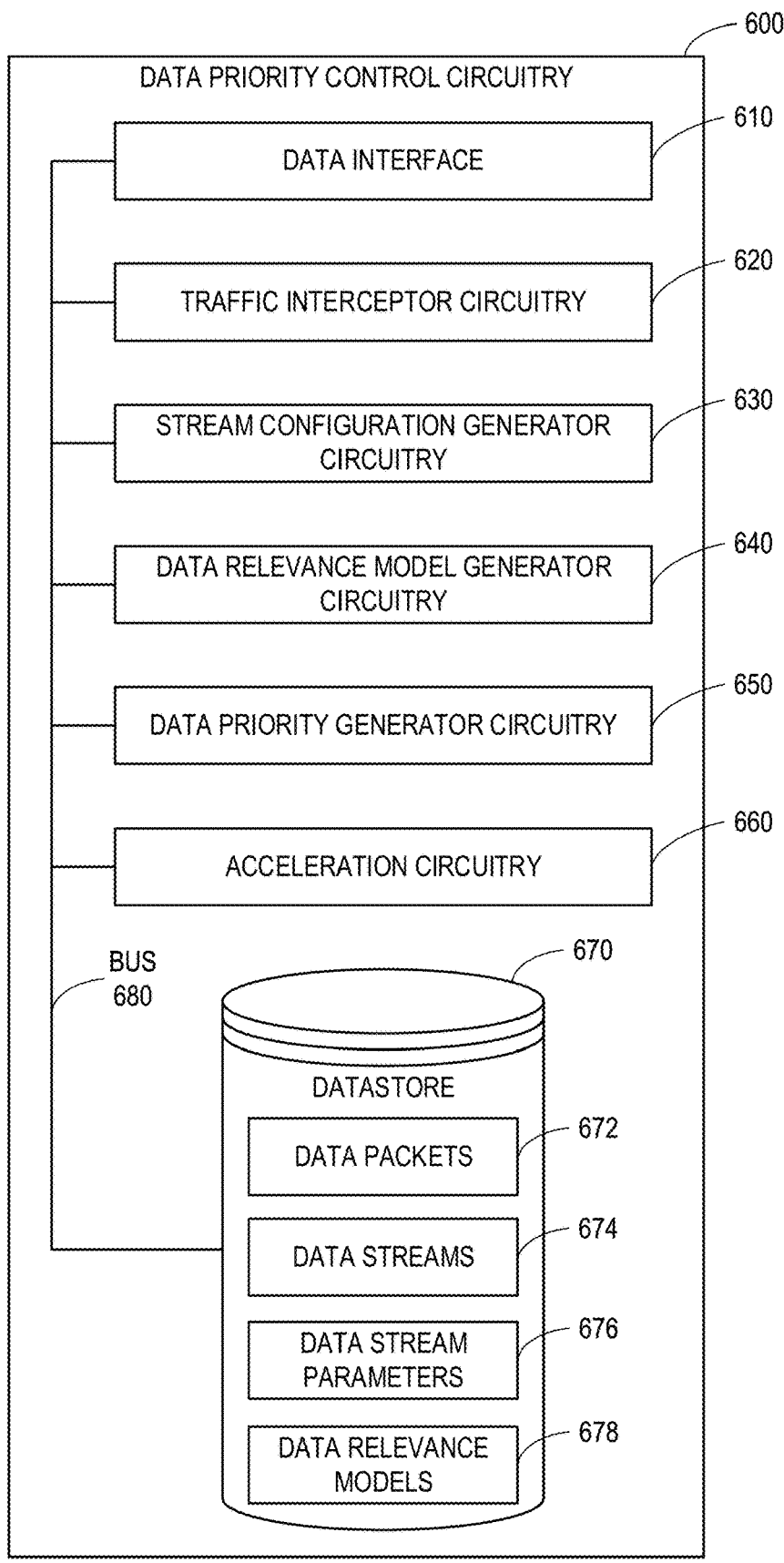
FIG. 6 depicts an example implementation of the example data priority control circuitry of FIG. 5.

FIG. 6 depicts example data priority control circuitry 600. In some examples, the data priority control circuitry 600 may be utilized to expand an infrastructure of an edge network environment to analyze data streams associated with services of interest to determine whether a priority from a data source is to be increased or reduced based on a global observed stream, which may be implemented by analyzing a plurality of data streams from a plurality of data sources to a plurality of data destinations. In some examples, the data priority control circuitry 600 may implement the data priority control circuitry 538 of FIG. 5.

The data priority control circuitry 600 of the illustrated example includes an example data interface 610, example traffic interceptor circuitry 620, example stream configuration generator circuitry 630, example data relevance model generator circuitry 640, example data priority generator circuitry 650, example acceleration circuitry 660, an example datastore 670, and an example bus 680. In this example, the datastore 670 may include and/or otherwise store example data packets 672, example data streams 674, example data stream parameters 676, and example data relevance models 678. In some examples, the acceleration circuitry 660 may implement the acceleration circuitry 542 of FIG. 5. In some examples, the data relevance models 678 may implement the data relevance model(s) 540 of FIG. 5.

In this example, one(s) of the data interface 610, the traffic interceptor circuitry 620, the stream configuration generator circuitry 630, the data relevance model generator circuitry 640, the data priority generator circuitry 650, the example acceleration circuitry 660, and/or the datastore 670 are in communication with one(s) of each other through the bus 680. For example, the bus 680 may implement at least one of an Inter-Integrated Circuit (I2C) bus, a Serial Peripheral Interface (SPI) bus, a PCI bus, or a PCIe bus. Additionally or alternatively, the bus 680 may implement any other type of computing or electrical bus.

In the illustrated example of FIG. 6, the data priority control circuitry 600 includes the data interface 610 to interface with an edge resource (e.g., an edge interface resource), such as an edge switch and/or an edge gateway. In some examples, the data interface 610 may receive data from and/or otherwise interface with an ingress port (e.g., one(s) of the ingress ports 534 of FIG. 5). In some examples, the data interface 610 may receive transmit data to and/or otherwise interface with an egress port (e.g., one(s) of the egress ports 536 of FIG. 5). For example, the data interface

610 may transmit data indicative of a priority, a change in priority, etc., of a message and/or a corresponding data stream. In some such examples, the data interface 610 may transmit a priority value of the first message 544 to the second one of the egress ports 536. In some such examples, in response to obtaining the priority value, the second one of the egress ports 536 may transmit the first message 544 based on the priority value. For example, the data interface 610 may cause transmission of the data packet based on the priority value.

In some examples, the data interface 610 may obtain a data packet, a message (e.g., a data message), etc., including one or more data stream parameters (e.g., one(s) of the data stream parameters 676). For example, the data interface 610 may obtain the first message 544, the second message 546, and/or the third message 548 of FIG. 5 from one(s) of the ingress ports 534. In some examples, the data interface 610 may obtain the data packet, the message, etc., by replicating and/or otherwise duplicating the data packet, the message, etc., or portion(s) thereof. For example, the first one of the ingress ports 534 may store the first message 544 in the edge circuitry 502. In some such examples, the data interface 610 may copy the first message 544 from the storage location in the edge circuitry 502.

In some examples, the data priority control circuitry 600 includes means for transmitting at least one of a data packet or a data stream based on a priority. For example, the means for transmitting may be implemented by the data interface 610. In some examples, the data interface 610 may be implemented by machine executable instructions such as that implemented by at least blocks 804, 818, 820 of FIG. 8 executed by processor circuitry, which may be implemented by the example processor circuitry 1012 of FIG. 10, the example graphics processor unit 1140 of FIG. 11, the example vision processor unit 1142 of FIG. 11, the example neural network processor 1144 of FIG. 11, the example microprocessor 1200 of FIG. 12, and/or the example FPGA circuitry 1300 of FIG. 13. In other examples, the data interface 610 is implemented by other hardware logic circuitry, hardware implemented state machines, and/or any other combination of hardware, software, and/or firmware. For example, the data interface 610 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In some examples in which the priority is a second priority, the data packet is a first data packet, the data stream is a first data stream, and, in response to a determination that a second data packet with a third priority is not associated with the first data stream or one or more second data streams, the data interface 610 is to cause transmission of the second data packet based on the third priority.

In the illustrated example of FIG. 6, the data priority control circuitry 600 includes the traffic interceptor circuitry 620 to intercept and/or otherwise direct a flow of data. In some examples, the traffic interceptor circuitry 620 may intercept and/or otherwise obtain a data packet from the data interface 610 and provide the data packet to the data relevance model generator circuitry 640. For example, the traffic interceptor circuitry 620 may determine that the data packet has a first priority and corresponds to one of the data streams 674. In some such examples, the traffic interceptor circuitry 620 may identify an association of the data packet and one of the data streams 674 based on the one or more data stream parameters of the data packet. In some such examples, the traffic interceptor circuitry 620 may provide the data packet to the data relevance model generator circuitry 640 in response to a determination that the data packet corresponds to the one of the data streams 674. In some examples described herein, an association (e.g., a data association, an association of two or more data elements or data portions, etc.) may be in a numerical or protocol form. For example, the association (e.g., the data association, the association of the two or more data elements or data portions, etc.) may be in any data format or representation such as, for example, character representation, floating point or real number representation, integer representation, string representation, binary data format, comma delimited data format, tab delimited data format, SQL structures, an executable, etc.

In some examples, the traffic interceptor circuitry 620 may determine to provide the data packet to the data relevance model generator circuitry 640 in response to a threshold (e.g., an interval threshold, an intercept threshold, an intercept rate threshold, etc.) has been satisfied. For example, the traffic interceptor circuitry 620 may determine whether an intercept threshold has been satisfied based on a number of obtained data packets of the data stream. In some examples described herein, a threshold may be a discrete value or a range of values that may be satisfied or achieved to induce or prepare for another logical computational result or operation. For example, the interval threshold, the intercept threshold, the intercept rate threshold, etc., may be a discrete value or a range of values that may be satisfied or achieved to induce or prepare for another logical computational result or operation.

In some examples, the traffic interceptor circuitry 620 may determine to provide 1 data packet for every 10 data packets received for a data stream. In some such examples, the traffic interceptor circuitry 620 may increment a counter for every data packet received for one of the data streams 674. In some examples, the traffic interceptor circuitry 620 may provide a data packet after a time period has elapsed. For example, the traffic interceptor circuitry 620 may provide 1 data packet to the data relevance model generator circuitry 640 per 30 second, 5 minute, 1 hour, etc., time period.

In some examples, the traffic interceptor circuitry 620 does not provide the data packet to the data relevance model generator circuitry 640 in response to a determination that the data packet does not correspond to one of the data streams 674. In some such examples, the traffic interceptor circuitry 620 may instruct the data interface 610 to inform one of the egress ports 536 to transmit the data packet based on the first priority (e.g., based on a priority that has not been adjusted based on content of the data packet).

In some examples, the traffic interceptor circuitry 620 provides the data packet to the data priority generator circuitry 650 and/or the acceleration circuitry 660 in response to a determination that the data packet corresponds to one of the data streams 674. For example, the traffic interceptor circuitry 620 may provide the data packet to the data priority generator circuitry 650 and/or the acceleration circuitry 660 to cause an execution of one(s) of the data relevance models 678 in response to a determination that the data packet corresponds to the one of the data streams 674. In some examples, the traffic interceptor circuitry 620 may update a priority of the data packet in response to the execution of the one(s) of the data relevance models 678.

In some examples, the traffic interceptor circuitry 620 may not provide the data packet to the data priority generator circuitry 650 and/or the acceleration circuitry 660 in response to a determination that the data packet does not correspond to one of the data streams 674. In some such examples, the traffic interceptor circuitry 620 may instruct the data interface 610 to inform one of the egress ports 536 to transmit the data packet based on the first priority (e.g., based on a priority that has not been adjusted based on content of the data packet).

In some examples, the data priority control circuitry 600 includes means for identifying an association of a data packet with a data stream based on one or more data stream parameters included in the data packet, the one or more data stream parameters corresponding to the data stream, and the data packet has a first priority. For example, the means for identifying may be implemented by the traffic interceptor circuitry 620. In some examples, the traffic interceptor circuitry 620 is to determine whether a threshold has been satisfied based on a number of obtained data packets of the data stream. In some examples, the traffic interceptor circuitry 620 may be implemented by machine executable instructions such as that implemented by at least blocks 806, 808, 812 of FIG. 8 executed by processor circuitry, which may be implemented by the example processor circuitry 1012 of FIG. 10, the example graphics processor unit 1140 of FIG. 11, the example vision processor unit 1142 of FIG. 11, the example neural network processor 1144 of FIG. 11, the example microprocessor 1200 of FIG. 12, and/or the example FPGA circuitry 1300 of FIG. 13. In other examples, the traffic interceptor circuitry 620 is implemented by other hardware logic circuitry, hardware implemented state machines, and/or any other combination of hardware, software, and/or firmware. For example, the traffic interceptor circuitry 620 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In the illustrated example of FIG. 6, the data priority control circuitry 600 includes the stream configuration generator circuitry 630 to generate the data streams 674, which may be implemented as associations of ones of the data stream parameters. For example, the stream configuration generator circuitry 630 may configure and/or register a first one of the data streams 674 corresponding to the first message 544 based on one or more data stream parameters of the first message 544, a second one of the data streams 674 corresponding to the second message 546 based on one or more data stream parameters of the second message 546, and/or a third one of the data streams 674 corresponding to the third message 548 based on one or more data stream parameters of the third message 548.

In some examples, the stream configuration generator circuitry 630 generates an identifier for a data stream of interest. For example, the stream configuration generator circuitry 630 may generate a first identifier of S1 for the first one of the data streams 674, a second identifier of S2 for the second one of the data streams 674, etc., which may be used to index the data streams 674 in the datastore 670. In some examples, the stream configuration generator circuitry 630 may store the identifier as one of the data stream parameters 676.

In some examples, the stream configuration generator circuitry 630 identifies one or more source data stream parameters associated with the data stream. For example, the stream configuration generator circuitry 630 may identify a source data stream parameter that may be implemented by a global process address identifier associated with a source service, which may be implemented by one of the first service 510, the second service 516, and/or the third service 522. In some examples, the stream configuration generator circuitry 630 may identify a source data stream parameter that may be implemented by an identifier of a source appliance or platform, which may be implemented by the first platform 512, the second platform 518, and/or the third platform 524. In some such examples, the identifier of the source appliance or platform may be implemented by an Internet Protocol (IP) address, an IP port number, a media access control (MAC) address, etc., and/or a combination thereof. For example, the stream configuration generator circuitry 630 may extract the IP address, the IP port number, the MAC address, etc., from a header of the first message 544. In some examples, the stream configuration generator circuitry 630 may store the one or more source data stream parameters as one(s) of the data stream parameters 676.

In some examples, the stream configuration generator circuitry 630 identifies one or more target data stream parameters associated with the data stream. For example, the stream configuration generator circuitry 630 may identify a target data stream parameter that may be implemented by a global process address identifier associated with a target service, which may be implemented by the fourth service 528. In some examples, the stream configuration generator circuitry 630 may identify a target data stream parameter that may be implemented by an identifier of a target appliance or platform, which may be implemented by the fourth platform 530. In some such examples, the identifier of the target appliance or platform may be implemented by an IP address, an IP port number, a MAC address, etc., and/or a combination thereof. For example, the stream configuration generator circuitry 630 may extract the IP address, the IP port number, the MAC address, etc., from a header of the first message 544. In some examples, the stream configuration generator circuitry 630 may store the one or more target data stream parameters as one(s) of the data stream parameters 676.

In some examples, the stream configuration generator circuitry 630 identifies a data type of payload data of data packets of the data stream. For example, the stream configuration generator circuitry 630 may identify a data stream parameter that may be implemented by an identifier that identifies whether the type of data of a data packet is sensor data, image or video data, ambient or latent data, etc. In some such examples, the type of data of the data packet may provide context of what the data is to the data relevance model generator circuitry 640 to determine how to analyze the data for changes in the data from one data packet to another data packet. For example, the stream configuration generator circuitry 630 may extract the data type from the first message 544 and/or may determine the data type based on data of the first message 544. In some examples, the stream configuration generator circuitry 630 may store the data type as one of the data stream parameters 676.

In some examples, the stream configuration generator circuitry 630 identifies a tenant ID associated with the data stream. For example, the stream configuration generator circuitry 630 may identify a data stream parameter that may be implemented by a tenant ID of a source service, a target service, etc. In some such examples, the stream configuration generator circuitry 630 may identify the tenant ID of one of the services 510, 516, 522, 528 of FIG. 5 as a data stream parameter of a corresponding data stream. For example, the stream configuration generator circuitry 630 may extract a tenant ID from the first message 544, and the tenant ID may identify the first service 510. In some examples, the stream configuration generator circuitry 630 may store the tenant ID as one of the data stream parameters 676.

In some examples, the stream configuration generator circuitry 630 identifies a definition data stream parameter (e.g., a stream definition data stream parameter) including a data type definition or a formula definition. In some examples described herein, a definition (e.g., a data type definition, a formula definition, etc.) may be in a numerical or protocol form. For example, the definition (e.g., the data type definition, the formula definition, etc.) may be in any data format or representation such as, for example, character representation, floating point or real number representation, integer representation, string representation, binary data format, comma delimited data format, tab delimited data format, SQL structures, an executable, etc.

In some examples, the stream configuration generator circuitry 630 may identify a definition data stream parameter that may be implemented by a type of data in a payload of a message. In some such examples, the type of data may be implemented by a character data type, an integer data type, a real data type, etc. In some examples, the stream configuration generator circuitry 630 may identify a definition data stream parameter that may be implemented by one or more algorithms, formulas, techniques, etc., and/or a combination thereof. For example, the one or more algorithms, formulas, techniques, etc., may be implemented by a data encryption or decryption technique (e.g., a symmetric, asymmetric, or hashing encryption or decryption technique). In some examples, the one or more algorithms, formulas, techniques, etc., may be implemented by a data compression or decompression technique (e.g., a lossless or lossy compression or decompression technique). In some examples, the one or more algorithms, formulas, techniques, etc., may be implemented by a mathematical formula such as converting a sensor measurement from a first unit of measure (e.g., a temperature unit of measure of degrees Kelvin, a pressure unit of measure of pascal, etc.) to a second unit of measure (e.g., a temperature unit of measure of degrees Fahrenheit, a pressure unit of atmospheres, etc.). In some examples, the stream configuration generator circuitry 630 may store the definition data stream parameter as one of the data stream parameters 676.

In some examples, the stream configuration generator circuitry 630 determines at least one of bit location(s) of the data packet based on the data type definition or technique(s) based on the formula definition. For example, the stream configuration generator circuitry 630 may identify 8 bit locations of a data payload to extract for processing in response to determining the data type of the payload is a character data type. In some examples, the stream configuration generator circuitry 630 may identify 32 bit locations of a data payload to extract for processing in response to determining the data type of the payload is an integer data type. In some examples, the stream configuration generator circuitry 630 may store the bit location(s) as one of the data stream parameters 676.

In some examples, the stream configuration generator circuitry 630 identifies an intercept rate of data packets of the data stream. For example, the stream configuration generator circuitry 630 may identify a rate at which the traffic interceptor circuitry 620 may provide data packets, or portion(s) thereof, to the data relevance model generator circuitry 640, the data priority generator circuitry 650, the acceleration circuitry 660, etc. In some such examples, the stream configuration generator circuitry 630 may identify the intercept rate based on a number of data packets received for one of the data streams 674, a time duration, etc., and/or a combination thereof. In some examples, the stream configuration generator circuitry 630 may store the intercept rate as one of the data stream parameters 676.

In some examples, the stream configuration generator circuitry 630 identifies association(s) between ones of the data streams 674. For example, the stream configuration generator circuitry 630 may identify relations between ones of the data streams 674. For example, the stream configuration generator circuitry 630 may identify related data streams including a first relation, first association, etc., between a first one of the data streams 674 that may correspond to the first industrial machine 416 and a second one of the data streams 674 that may correspond to the vehicle 426 because the first industrial machine 416 may be controlled to load items, packages, components, etc., onto the vehicle 426. In some examples, the stream configuration generator circuitry 630 may identify a second relation, a second association, etc., between a third one of the data streams 674 that may correspond to the first monitoring sensor 428 and a fourth one of the data streams 674 that may correspond to the predictive maintenance system 424 because the first monitoring sensor 428 may measure prognostic health data that the predictive maintenance system 424 may use to make determinations of predictive maintenance actions, alerts, etc. In some examples, the stream configuration generator circuitry 630 may store the association(s) as one(s) of the data stream parameters 676.

In some examples, the data priority control circuitry 600 includes means for configuring a data stream. For example, the means for configuring may be implemented by the stream configuration generator circuitry 630. In some examples, the stream configuration generator circuitry 630 may be implemented by machine executable instructions such as that implemented by at least blocks 802 of FIG. 8 and/or blocks 902, 904, 906, 908, 910, 912, 914, 916, 920, 922 of FIG. 9 executed by processor circuitry, which may be implemented by the example processor circuitry 1012 of FIG. 10, the example graphics processor unit 1140 of FIG. 11, the example vision processor unit 1142 of FIG. 11, the example neural network processor 1144 of FIG. 11, the example microprocessor 1200 of FIG. 12, and/or the example FPGA circuitry 1300 of FIG. 13. In other examples, the stream configuration generator circuitry 630 is implemented by other hardware logic circuitry, hardware implemented state machines, and/or any other combination of hardware, software, and/or firmware. For example, the stream configuration generator circuitry 630 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In some examples in which the one or more data stream parameters are one or more first data stream parameters, the stream configuration generator circuitry 630 identifies one or more source data stream parameters including at least one of a source service or a source appliance associated with the data stream. In some such examples, the stream configuration generator circuitry 630 identifies one or more target data stream parameters including at least one of a target service, a target appliance, a first identifier of the target service, or a second identifier of the target appliance associated with the data stream. In some such examples, the stream configuration generator circuitry 630 identifies a data type of payload data of the data packet, and the model is based on at least one of the one or more data stream parameters, the one or more target data stream parameters, or the data type. In some such examples, the stream configuration generator circuitry 630 stores at least one of the one or more source data stream parameters, the one or more target data stream parameters, or the data type as second data stream parameters, and the second data stream parameters include the one or more first data stream parameters. In some such examples, the stream configuration generator circuitry 630 is to configure the data stream based on the at least one of the one or more source data stream parameters, the one or more target data stream parameters, or the data type.

In some examples, the stream configuration generator circuitry 630 identifies a definition data stream parameter including a data type definition or a formula definition. In some such examples, the stream configuration generator circuitry 630 is to, in response to a first identification of the definition data stream parameter as the data type definition, determine one or more bit locations of a bit stream of the data packet to extract, and the execution of the model is based on the one or more bit locations to extract. In some such examples, the stream configuration generator circuitry 630 is to, in response to a second identification of the definition data stream parameter as the formula definition based on a compression or encryption of the bit stream, determine a decompression technique or a decryption technique, and the execution of the model is based on the decompression technique or the decryption technique.

In the illustrated example of FIG. 6, the data priority control circuitry 600 includes the data relevance model generator circuitry 640 to generate the data relevance models 678 for ones of the data streams 674. For example, the data relevance model generator circuitry 640 may generate the data relevance models 678 based on ones of the data stream parameters 676 that correspond to the data streams 674. In some examples, the data relevance model generator circuitry 640 may store association(s) of one(s) of the data streams 674, the data stream parameters 676, and/or the data relevance models 678 in the datastore 670. In some such examples, the data streams 674 may be implemented by the associations. For example, the data streams 674 may be implemented as an organized body of related data. In some such examples, the organized body of related data may be in the form of one or more of a table, a datagram, a file, a document, a report, a list or in any other form.

In some examples, the data relevance model generator circuitry 640 re-trains one(s) of the data relevance models 678 based on training data, which may be implemented by one or more of the data packets 672, or portion(s) thereof (e.g., one or more data stream parameters associated with the one or more data packets 672, header(s), data payload(s), etc.). In some examples, the data packets 672 may be implemented by one or more data packets, one or more messages, etc., of a data stream. For example, the data packets 672 may be implemented by the first message 544, the second message 546, the third message 548 of FIG. 5, etc., and/or portion(s) thereof (e.g., a header, a payload, etc.).

Artificial Intelligence (AI), including machine learning (ML), deep learning (DL), and/or other artificial machine-driven logic, enables machines (e.g., computers, logic circuits, etc.) to use a model, such as one of the data relevance models 678, to process input data (e.g., model input(s)) to generate an output (e.g., a model output) based on patterns and/or associations previously learned by the model via a training process. In some examples, the data relevance models 678 may implement an AI/ML model. For instance, the data relevance model generator circuitry 640 may train the data relevance models 678 with data to recognize patterns and/or associations and follow such patterns and/or associations when processing input data such that other input(s) result in output(s) consistent with the recognized patterns and/or associations.

Many different types of machine-learning models and/or machine-learning architectures exist. In some examples, the data relevance model generator circuitry 640 may generate the data relevance models 678 as neural network models. Using a neural network model enables the acceleration circuitry 660 to execute an AI/ML workload. In general, machine-learning models/architectures that are suitable to use in the example approaches disclosed herein include recurrent neural networks. However, other types of machine learning models could additionally or alternatively be used such as supervised learning artificial neural network (ANN) models, clustering models, classification models, etc., and/or a combination thereof. Example supervised learning ANN models may include two-layer (2-layer) radial basis neural networks (RBN), learning vector quantization (LVQ) classification neural networks, etc. Example clustering models may include k-means clustering, hierarchical clustering, mean shift clustering, density-based clustering, etc. Example classification models may include logistic regression, support-vector machine or network, Naive Bayes, etc. In some examples, the data relevance model generator circuitry 640 may compile and/or otherwise generate one(s) of the data relevance models 678 as lightweight machine-learning models.

In general, implementing an ML/AI system involves two phases, a learning/training phase and an inference phase. In the learning/training phase, the data relevance model generator circuitry 640 may use a training algorithm to train the data relevance models 678 to operate in accordance with patterns and/or associations based on, for example, training data. In general, the data relevance models 678 includes internal parameters that guide how input data is transformed into output data, such as through a series of nodes and connections within the data relevance models 678 to transform input data into output data. Additionally, the data relevance model generator circuitry 640 may use hyperparameters as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, the data relevance model generator circuitry 640 may invoke supervised training to use inputs (e.g., the data packets 672, the data streams 674, the data stream parameters 676, etc.) and corresponding expected (e.g., labeled) outputs to select parameters (e.g., by iterating over combinations of select parameters) for the data relevance models 678 that reduce model error. As used herein, "labeling" refers to an expected output of the machine learning model (e.g., a classification, an expected output value, etc.). Alternatively, the data relevance model generator circuitry 640 may use unsupervised training (e.g., used in deep learning, a subset of machine learning, etc.) that involves inferring patterns from inputs to select parameters for the data relevance models 678 (e.g., without the benefit of expected (e.g., labeled) outputs).

In some examples, the data relevance model generator circuitry 640 trains the data relevance models 678 using unsupervised clustering of operating observables. However, the data relevance model generator circuitry 640 may additionally or alternatively use any other training algorithm such as stochastic gradient descent, Simulated Annealing, Particle Swarm Optimization, Evolution Algorithms, Genetic Algorithms, Nonlinear Conjugate Gradient, etc.

In some examples, the data relevance model generator circuitry 640 may train the data relevance models 678 until the level of error is no longer reducing. In some examples, the data relevance model generator circuitry 640 may train the data relevance models 678 locally on an edge resource (e.g., the edge circuitry 502 of FIG. 5) and/or remotely at an external computing system (e.g., one(s) of the cloud data center 130 of FIG. 1, the edge cloud 110 of FIGS. 1-3, the cloud data center 245 of FIG. 2, the cloud or data center 360 of FIG. 3, the edge cloud 410 of FIG. 4, etc.) communicatively coupled to the edge resource. In some examples, the data relevance model generator circuitry 640 trains the data relevance models 678 using hyperparameters that control how the learning is performed (e.g., a learning rate, a number of layers to be used in the machine learning model, etc.). In some examples, the data relevance model generator circuitry 640 may use hyperparameters that control model performance and training speed such as the learning rate and regularization parameter(s). The data relevance model generator circuitry 640 may select such hyperparameters by, for example, trial and error to reach an optimal model performance. In some examples, the data relevance model generator circuitry 640 utilizes Bayesian hyperparameter optimization to determine an optimal and/or otherwise improved or more efficient network architecture to avoid model overfitting and improve the overall applicability of the data relevance models 678. Alternatively, the data relevance model generator circuitry 640 may use any other type of optimization. In some examples, the data relevance model generator circuitry 640 may perform re-training. The data relevance model generator circuitry 640 may execute such re-training in response to override(s) by a user of the edge resource, a receipt of new training data, etc.

In some examples, the data relevance model generator circuitry 640 facilitates the training of the data relevance models 678 using training data. In some examples, the data relevance model generator circuitry 640 utilizes training data that originates from locally generated data. In some examples, the data relevance model generator circuitry 640 utilizes training data that originates from externally generated data. In some examples where supervised training is used, the data relevance model generator circuitry 640 may label the training data. Labeling is applied to the training data by a user manually or by an automated data pre-processing system. In some examples, the data relevance model generator circuitry 640 may pre-process the training data using, for example, an interface (e.g., the data interface 610). In some examples, the data relevance model generator circuitry 640 sub-divides the training data into a first portion of data for training the data relevance models 678, and a second portion of data for validating the data relevance models 678.

Once training is complete, the data relevance model generator circuitry 640 may deploy the data relevance models 678 for use as an executable construct that processes an input (e.g., a model input) and provides an output (e.g., a model output) based on the network of nodes and connections defined in the data relevance models 678. The data relevance model generator circuitry 640 may store the data relevance models 678 in the datastore 670. In some examples, the data relevance model generator circuitry 640 may invoke the data interface 610 to transmit the data relevance models 678 to different edge resources (e.g., a different edge switch than the edge switch 404 in the edge network environment 400 of FIG. 4, a different edge gateway than the edge gateway 402 of FIG. 4 in the edge network environment 400 of FIG. 4, etc.) to improve global observability of edge data prioritization. In some such examples, in response to transmitting the data relevance models 678 to the one(s) of the different edge resources, the one(s) of the different edge resources may execute the data relevance models 678 to execute AI/ML workloads with at least one of improved efficiency or performance.

Once trained, the deployed one(s) of the data relevance models 678 may be operated in an inference phase to process data. In the inference phase, data to be analyzed (e.g., live data) is input to the data relevance models 678, and the data relevance models 678 execute(s) to create an output. This inference phase can be thought of as the AI "thinking" to generate the output based on what it learned from the training (e.g., by executing the data relevance models 678 to apply the learned patterns and/or associations to the live data). In some examples, input data undergoes pre-processing before being used as an input to the data relevance models 678. Moreover, in some examples, the output data may undergo post-processing after it is generated by the data relevance models 678 to transform the output into a useful result (e.g., a display of data, a detection and/or identification of an object, an instruction to be executed by a machine, a new, adjusted, or modified priority value of a message, etc.).

In some examples, output of the deployed one(s) of the data relevance models 678 may be captured and provided as feedback. By analyzing the feedback, an accuracy of the deployed one(s) of the data relevance models 678 can be determined. If the feedback indicates that the accuracy of the deployed model is less than a threshold or other criterion, training of an updated model can be triggered using the feedback and an updated training data set, hyperparameters, etc., to generate an updated, deployed model.

In some examples, the data priority control circuitry 600 includes means for training a model. In some examples, the data relevance model generator circuitry 640 is to train the model based on the one or more data stream parameters in response to a determination that a threshold has been satisfied. For example, the means for training may be implemented by the data relevance model generator circuitry 640. In some examples, the data relevance model generator circuitry 640 may be implemented by machine executable instructions such as that implemented by at least blocks 802, 812 of FIG. 8 and/or block 918 of FIG. 9 executed by processor circuitry, which may be implemented by the example processor circuitry 1012 of FIG. 10, the example graphics processor unit 1140 of FIG. 11, the example vision processor unit 1142 of FIG. 11, the example neural network processor 1144 of FIG. 11, the example microprocessor 1200 of FIG. 12, and/or the example FPGA circuitry 1300 of FIG. 13. In other examples, the data relevance model generator circuitry 640 is implemented by other hardware logic circuitry, hardware implemented state machines, and/or any other combination of hardware, software, and/or firmware. For example, the data relevance model generator circuitry 640 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In the illustrated example of FIG. 6, the data priority control circuitry 600 includes the data priority generator circuitry 650 to execute the data relevance models 678 based on one or more data stream parameters to generate model output(s), which may be used to determine an adjusted priority of a data packet. In some examples, the data priority generator circuitry 650 identifies a first model corresponding to a data stream. For example, the data priority generator circuitry 650 determine that the first message 544 corresponds to one of the data streams 674 based on one or more of the data stream parameters 676 associated with the first message 544. In some such examples, the data priority generator circuitry 650 may determine that a first one of the data relevance models 678 corresponds to the identified one of the data streams 674.

In some examples, the data priority generator circuitry 650 determines whether there is a technique associated with the data stream. For example, the data priority generator circuitry 650 may determine that the data stream is not associated with a technique and thereby may determine bit location(s) of a data packet to extract as model input(s) to the data relevance models 678. In some examples, in response to a determination that the data stream is associated with a decompression technique, the data priority generator circuitry 650 may decompress a data payload of the data packet with the decompression technique to generate the model input(s). In some examples, in response to a determination that the data stream is associated with a decryption technique, the data priority generator circuitry 650 may decrypt the data payload of the data packet with the decryption technique to generate the model input(s). In some such examples, the data priority generator circuitry 650 may decrypt the data payload in a TEE, a sandbox, etc.

In some examples, the data priority generator circuitry 650 determines a priority for the data packet based on model output(s) from the data relevance models 678. For example, the data priority generator circuitry 650 may determine a first priority for the data packet based on the model output(s). In some such examples, the first priority may be higher than a second priority initially assigned to the data packet based on QoS or tenant ID requirements. In some examples, the data priority generator circuitry 650 invokes execution of one(s) of the data relevance models 678 that is/are associated with a related or associated data stream.

In some examples, the data priority control circuitry 600 includes means for determining a second priority of at least one of a data packet or a data stream based on a model output. In some such examples, the model output may be indicative of an adjustment of the first priority to a second priority. For example, the means for determining may be implemented by the data priority generator circuitry 650. In some examples, the data priority generator circuitry 650 may be implemented by machine executable instructions such as that implemented by at least blocks 814, 816, 818 of FIG. 8 and/or blocks 1002, 1004, 1006, 1008, 1010, 1012, 1014, 1016, 1018, 1020 of FIG. 10 executed by processor circuitry, which may be implemented by the example processor circuitry 1012 of FIG. 10, the example graphics processor unit 1140 of FIG. 11, the example vision processor unit 1142 of FIG. 11, the example neural network processor 1144 of FIG. 11, the example microprocessor 1200 of FIG. 12, and/or the example FPGA circuitry 1300 of FIG. 13. In other examples, the data priority generator circuitry 650 is implemented by other hardware logic circuitry, hardware implemented state machines, and/or any other combination of hardware, software, and/or firmware. For example, the data priority generator circuitry 650 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In some examples in which an association is a first association, the data priority generator circuitry 650 is to identify a second association of the one or more data stream parameters and a decryption technique. In some such examples, the data priority generator circuitry 650 is to decrypt the one or more data stream parameters in a trusted execution environment, and the execution of the model is based on the decryption of the one or more data stream parameters.

In some examples in which an association is a first association, a data packet is a first data packet, a data stream is a first data stream, a model is a first model, and a model output is a first model output, the data priority generator circuitry 650 is to identify a second association of the first data stream and a second data stream, and determine a priority of a second data packet based on a second model output, and the second data packet is obtained after the first data packet.

In the illustrated example of FIG. 6, the data priority control circuitry 600 includes the acceleration circuitry 660 to execute one(s) of the data relevance models 678 with the model input(s) to generate model output(s). For example, the acceleration circuitry 660 may be implemented by one or more GPUs, one or more AI/ML accelerators, one or more DSPs, one or more ASICs, one or more PLDs, one or more FPLDs, etc., and/or a combination thereof. In some examples, the acceleration circuitry 660 may implement a TEE, a sandbox, etc., in which to execute encrypted data included in the messages 544, 546, 548, the data packets 672, etc.

In some examples, the data priority control circuitry 600 includes means for executing a model based on one or more data stream parameters to generate a model output. For example, the means for executing may be implemented by the acceleration circuitry 660. In some examples, the acceleration circuitry 660 may be implemented by machine executable instructions such as that implemented by at least blocks 814, 816 of FIG. 8 and/or blocks 1012, 1018 of FIG. 10 executed by processor circuitry, which may be implemented by the example processor circuitry 1012 of FIG. 10, the example graphics processor unit 1140 of FIG. 11, the example vision processor unit 1142 of FIG. 11, the example neural network processor 1144 of FIG. 11, the example microprocessor 1200 of FIG. 12, and/or the example FPGA circuitry 1300 of FIG. 13. In other examples, the acceleration circuitry 660 is/are implemented by other hardware logic circuitry, hardware implemented state machines, and/or any other combination of hardware, software, and/or firmware. For example, the acceleration circuitry 660 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In some examples in which an association is a first association, a data packet is a first data packet, a data stream is a first data stream, a model is a first model, and a model output is a first model output, the acceleration circuitry 660 is/are to execute a second model based on the one or more data stream parameters to generate a second model output, and the second model is associated with the second data stream.

In the illustrated example of FIG. 6, the data priority control circuitry 600 includes the datastore 670 to record data (e.g., the data packets 672, the data streams 674, the data stream parameters 676, the data relevance models 678, etc.). The datastore 670 of this example may be implemented by a volatile memory (e.g., a Synchronous Dynamic Random Access Memory (SDRAM), a Dynamic Random Access Memory (DRAM), a RAMBUS Dynamic Random Access Memory (RDRAM), etc.) and/or a non-volatile memory (e.g., flash memory). The datastore 670 may additionally or alternatively be implemented by one or more double data rate (DDR) memories, such as DDR, DDR2, DDR3, DDR4, mobile DDR (mDDR), etc. The datastore 670 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the datastore 670 is illustrated as a single datastore, the datastore 670 may be implemented by any number and/or type(s) of datastores. Furthermore, the data stored in the datastore 670 may be in any data format such as, for example, binary data, comma delimited data, tab delimited data, structured query language (SQL) structures, an executable, etc.

While an example manner of implementing the data priority control circuitry 538 of FIG. 5 is illustrated in FIG. 6, one or more of the elements, processes and/or devices illustrated in FIG. 6 may be combined, divided, re-arranged, omitted, eliminated and/or implemented in any other way. Further, the example data interface 610, the example traffic interceptor circuitry 620, the example stream configuration generator circuitry 630, the example data relevance model generator circuitry 640, the example data priority generator circuitry 650, the example acceleration circuitry 660, the example datastore 670, the example data packets 672, the example data streams 674, the example data stream parameters 676, the example data relevance models 678, and/or, more generally, the example data priority control circuitry 538 of FIG. 5 may be implemented by hardware, software, firmware, and/or any combination of hardware, software and/or firmware. Thus, for example, any of the example data interface 610, the example traffic interceptor circuitry 620, the example stream configuration generator circuitry 630, the example data relevance model generator circuitry 640, the example data priority generator circuitry 650, the example acceleration circuitry 660, the example datastore 670, the example data packets 672, the example data streams 674, the example data stream parameters 676, the example data relevance models 678, and/or, more generally, the example data priority control circuitry 538 of FIG. 5 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example data interface 610, the example traffic interceptor circuitry 620, the example stream configuration generator circuitry 630, the example data relevance model generator circuitry 640, the example data priority generator circuitry 650, the example acceleration circuitry 660, the example datastore 670, the example data packets 672, the example data streams 674, the example data stream parameters 676, and/or the example data relevance models 678 is/are hereby expressly defined to include a non-transitory computer readable storage device or storage disk such as a memory, a DVD, a CD, a Blu-ray disk, etc., including the software and/or firmware. Further still, the example data priority control circuitry 538 of FIG. 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
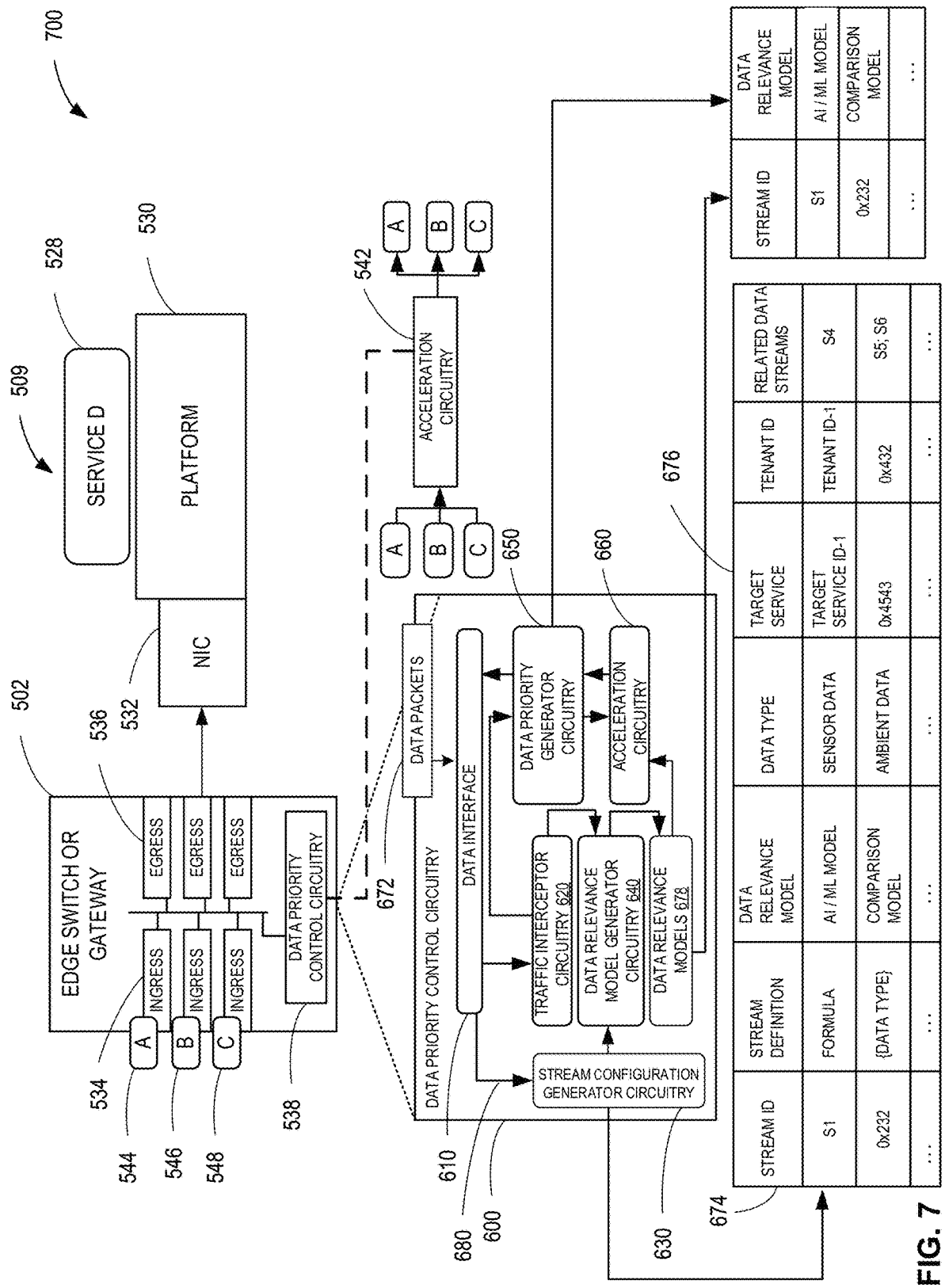
FIG. 7 depicts an example workflow corresponding to example operation of the example edge gateway and/or the example edge switch of FIGS. 4 and/or 5 and/or the example data priority control circuitry of FIGS. 5 and/or 6.

FIG. 7 depicts an example workflow 700 corresponding to example operation of the example edge circuitry 502 of FIG. 5, the example data priority control circuitry 538 of FIG. 5, and/or the example data priority control circuitry 600 of FIG. 6. The workflow 700 includes the edge circuitry 502 of FIG. 5, which includes the ingress ports 534, the egress ports 536, the messages 544, 546, 548, the data priority control circuitry 538, the acceleration circuitry 542, the fourth service 528, the fourth NIC 532, and the fourth platform 530 of FIG. 5. In this example, the data priority control circuitry 538 of FIG. 5 may be implemented by the data priority control circuitry 600 of FIG. 6. In this example, the acceleration circuitry 542 of FIG. 5 may be implemented by the acceleration circuitry 660 of FIG. 5. In this example, the data priority control circuitry 600 of FIG. 6 may be implemented by the data interface 610, the traffic interceptor circuitry 620, the stream configuration generator circuitry 630, the data relevance model generator circuitry 640, the data priority generator circuitry 650, the acceleration circuitry 660, the data packets 672, the data streams 674, the data stream parameters 676, the data relevance models 678, and the bus 680 of FIG. 6. In this example, connection(s) between one(s) of the data interface 610, the traffic interceptor circuitry 620, the stream configuration generator circuitry 630, the data relevance model generator circuitry 640, the data priority generator circuitry 650, and the acceleration circuitry 660 may be implemented by the bus 680 of FIG. 6.

In some examples, the data priority control circuitry 600 registers the data relevance model generator circuitry 640 to analyze, inspect, and/or otherwise process the data packets 672 associated with data streams from a data source to a data destination, which may be implemented by the fourth service 528. In some such examples, the data relevance model generator circuitry 640 may generate the data relevance models 678 by training the data relevance models 678 based on the data packets 672, or portion(s) thereof. Advantageously, the data priority generator circuitry 650 may invoke the acceleration circuitry 660 to load the data relevance models 678 for execution to establish when a priority of one(s) of the data packets 672 is/are to be increased from a first priority to a second priority based on observations of data streams corresponding to a plurality of data sources and/or data destinations.

In the illustrated example of FIG. 7, the data streams 674 include one or more data streams that is/are representative of communications between data source(s) and data destination(s). In this example, the data streams 674 include a first data stream and a second data stream that each have one or more corresponding data stream parameters 676 including a definition (e.g., a stream definition), a data relevance model, a data type, a target service (e.g., a target data stream parameter), a tenant ID, and related data streams. Alternatively, the data streams 674 may have fewer or more stream data parameters than depicted in FIG. 7.

In the illustrated example of FIG. 7, the data streams 674 include the first data stream having a stream identifier (ID) of S1 and the second data stream having a stream ID of 0x232. The first data stream has a first stream definition of FORMULA, which is indicative of converting and/or otherwise processing data in a payload of the data packets 672 with one or more formulae, techniques, etc. The first data stream has a corresponding data relevance model of an AI/ML model. The first data stream has a data type of SENSOR DATA, which is indicative of the payload being representative of data from a sensor. The first data stream has a target service of TARGET SERVICE ID-1, which identifies a target service having an identifier of ID-1. The first data stream has a tenant ID of TENANT ID-1, which identifies a tenant of the target service having an ID of ID-1. The first data stream is related and/or otherwise associated with another data stream with the stream ID of S4.

In the illustrated example of FIG. 7, the second stream of the data streams 674 has a second stream definition of {DATA TYPE}, which is indicative of extracting one or more bits of the payload of data packets of the second data stream because the data packets may have a character, a string, an integer, etc., data type. The second data stream has a corresponding data relevance model of a comparison model, which may be indicative of comparing a bit stream of the data packets 672 to a known bit stream. The second data stream has a data type of AMBIENT DATA, which is indicative of the payload being representative of ambient or latent data. The second data stream has a target service of 0x4543, which identifies a target service having an identifier of 0x4543. The second data stream has a tenant ID of 0x432, which identifies a tenant of the target service having an ID of 0x432. The second data stream is related and/or otherwise associated with other data streams with the stream IDs of S5 and S6.

In example operation, the data interface 610 may duplicate the data packets 672 that are to be provided from the ingress ports 534 to the egress ports 536. The data interface 610 may provide the duplicated one(s) of the data packets 672 to the traffic interceptor circuitry 620. The traffic interceptor circuitry 620 may provide one(s) of the data packets 672, which correspond to one(s) of the data streams 674, to the data relevance model generator circuitry 640 and/or the data priority generator circuitry 650.

In example operation, the data relevance model generator circuitry 640 may generate, train, and/or re-train the data relevance models 678 based on the data packets 672. In example operation, the data priority generator circuitry 650 may invoke the acceleration circuitry 660 to execute the data relevance models 678 with the data packets 672, one or more of the data stream parameters 676 corresponding to the data packets 672, etc., as model inputs to generate and/or otherwise output model outputs. For example, the data priority generator circuitry 650 may identify that a first one of the data packets 672 corresponds to the first data stream of the data streams 674 with the stream ID of S1. In some such examples, in response to the identification of the stream ID S1, the data priority generator circuitry 650 may determine that the stream ID S1 has a corresponding AI/ML model. For example, the data priority generator circuitry 650 may instruct the acceleration circuitry 660 to load one of the data relevance models 678 that corresponds to the AI/ML model indicated by the data stream parameters of the first stream having the stream ID of S1. In some such examples, the first one of the data packets 672 may originate from the first monitoring sensor 428 of FIG. 4, which may be implemented by a video camera. In some such examples, the acceleration circuitry 660 may execute the AI/ML model to determine whether the data included in the first one of the data packets 672 indicates a detection of one or more persons in the edge network environment 400 of FIG. 4. In some such examples, the acceleration circuitry 660 may provide the indication of the detection to the data priority generator circuitry 650 as a model output, which may cause the data priority generator circuitry 650 to increase a priority of the first one of the data packets 672 and/or subsequent ones of the data packets 672 that correspond to the first data stream.

In example operation, the data priority generator circuitry 650 may provide the new or adjusted priority of the first one of the data packets 672, and/or, more generally, data packets that correspond to the first data stream, to one(s) of the egress ports 536. For example, the data priority generator circuitry 650 may provide the new or adjusted priority to the data interface 610, which may provide the new or adjusted priority to the one(s) of the egress ports 536. Advantageously, the data priority generator circuitry 650, and/or, more generally, the data priority control circuitry 600 of FIG. 6, and/or, more generally, the data priority control circuitry 538 of FIG. 5, may dynamically determine prioritization of data packets generated at the edge based on the content of the data packets additionally or alternatively to QoS-based priority determinations, tenant ID-based determinations, etc.

Figure 8:
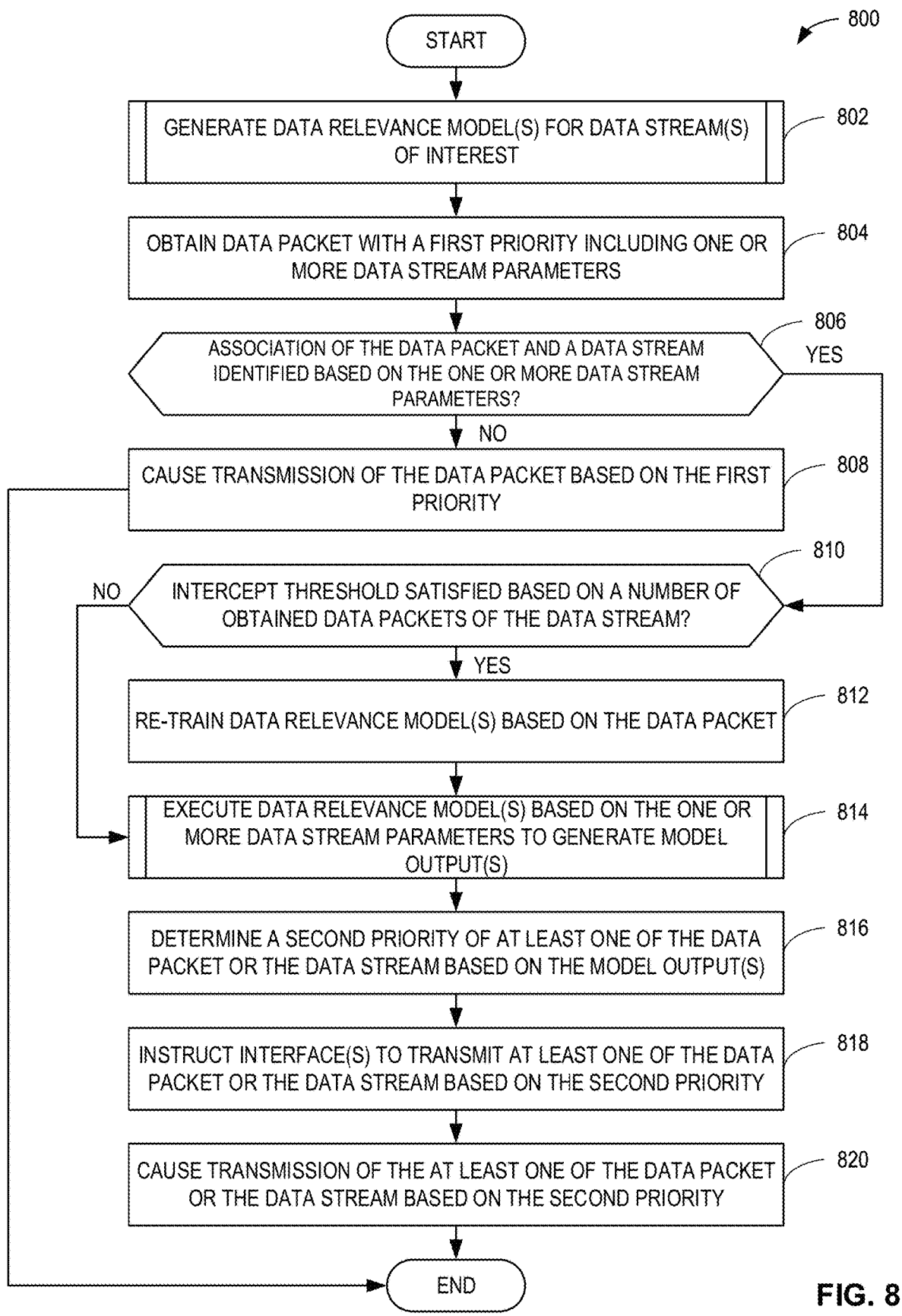
FIG. 8 is a flowchart representative of example machine readable instructions that may be executed and/or instantiated to implement the example edge gateway and/or the example edge switch of FIGS. 4, 5, and/or 7 and/or the example data priority control circuitry of FIGS. 5, 6, and/or 7 to cause transmission of a data packet based on example data relevance model(s).
Figure 9:
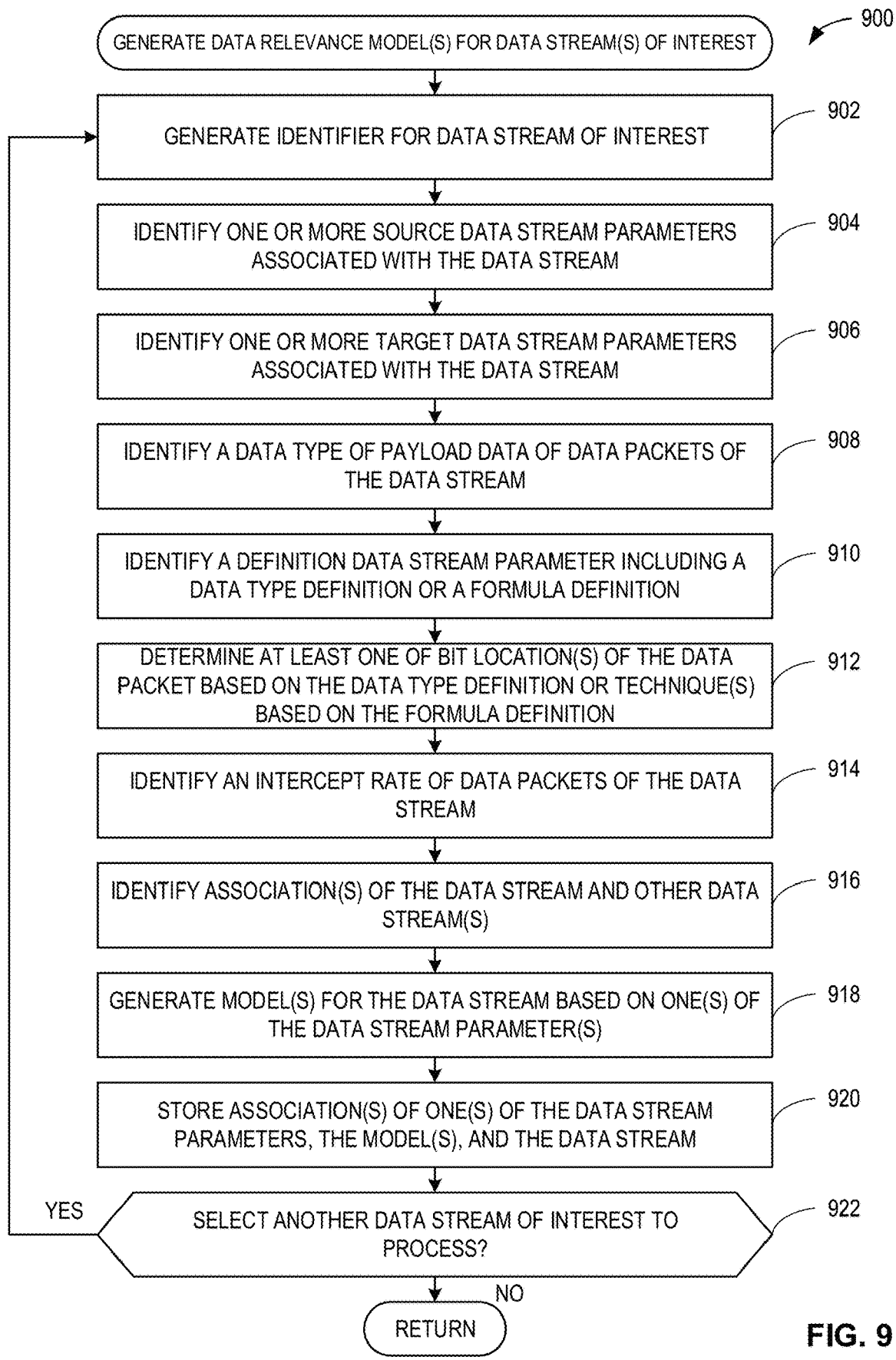
FIG. 9 is a flowchart representative of example machine readable instructions that may be executed and/or instantiated to implement the example edge gateway and/or the example edge switch of FIGS. 4, 5, and/or 7 and/or the example data priority control circuitry of FIGS. 5, 6, and/or 7 to generate example data relevance model(s) for example data stream(s) of interest.
Figure 10:
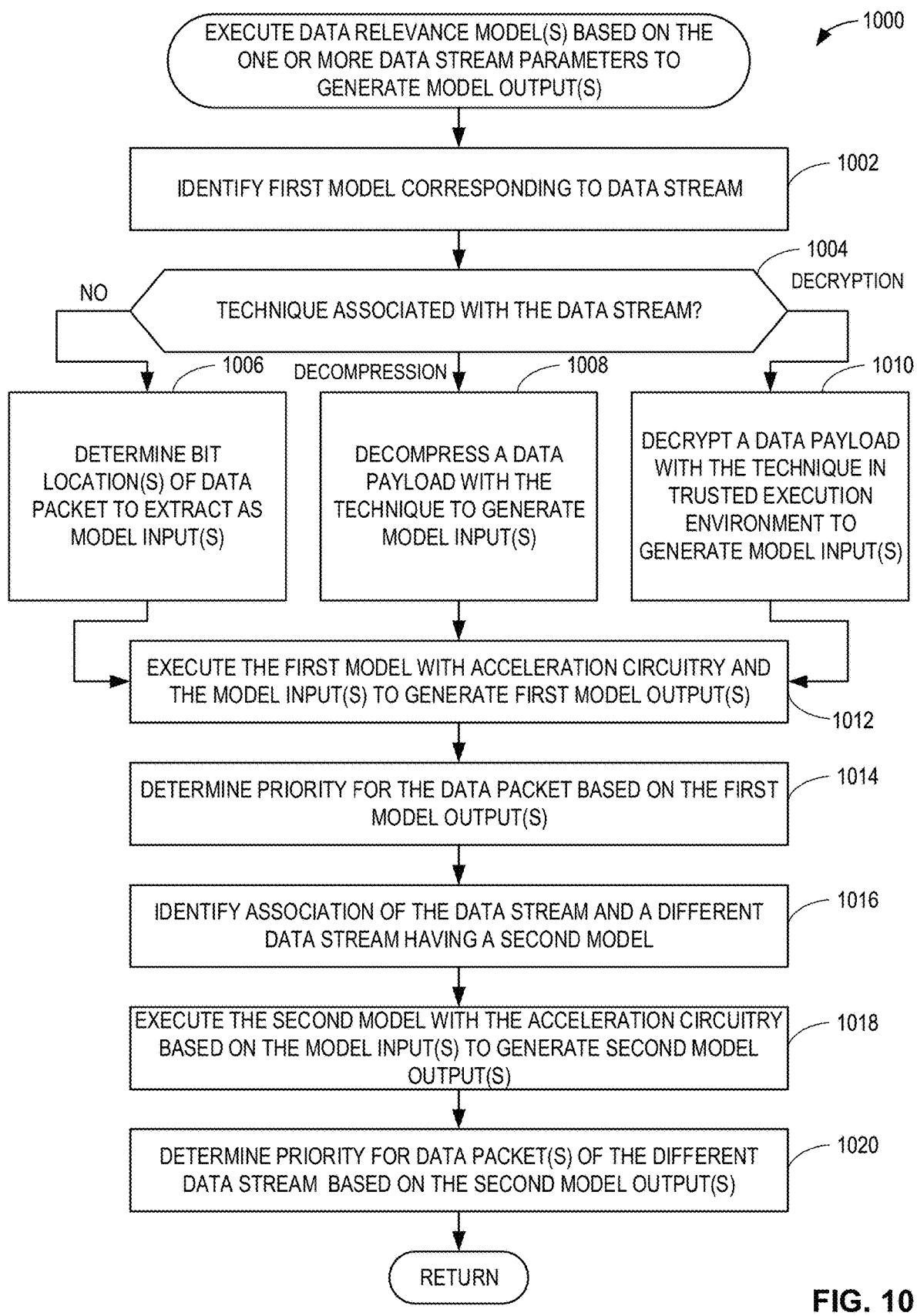
FIG. 10 is a flowchart representative of example machine readable instructions that may be executed and/or instantiated to implement the example edge gateway and/or the example edge switch of FIGS. 4, 5, and/or 7 and/or the example data priority control circuitry of FIGS. 5, 6, and/or 7 to execute example data relevance model(s) based on one or more example data stream parameters to generate example model output(s).

Flowcharts representative of example hardware logic, machine readable instructions, hardware implemented state machines, and/or any combination thereof for implementing the example edge gateway 402 of FIG. 4, the example edge switch 404 of FIG. 4, the example edge circuitry 502 of FIG. 5, the example data priority control circuitry 538 of FIGS. 5 and/or 7, and/or the example data priority control circuitry 600 of FIGS. 6 and/or 7 is shown in FIGS. 8-10. The machine readable instructions may be one or more executable programs or portion(s) of an executable program for execution by a computer processor and/or processor circuitry, such as the processor circuitry 1112 shown in the example processor platform 1100 discussed below in connection with FIG. 11 and/or the processor circuitry discussed below in connection with FIGS. 12 and/or 13. The program may be embodied in software stored on a non-transitory computer readable storage medium such as a CD-ROM, a floppy disk, a hard drive, a DVD, a Blu-ray disk, or a memory associated with the processor circuitry 1112, but the entire program and/or parts thereof could alternatively be executed by a device other than the processor circuitry 1112 and/or embodied in firmware or dedicated hardware. Further, although the example program is described with reference to the flowcharts illustrated in FIGS. 8-10, many other methods of implementing the example edge gateway 402 of FIG. 4, the example edge switch 404 of FIG. 4, the example edge circuitry 502 of FIG. 5, the example data priority control circuitry 538 of FIGS. 5 and/or 7, and/or the example data priority control circuitry 600 of FIGS. 6 and/or 7 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of machine executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), SQL, Swift, etc.

As mentioned above, the example processes of FIGS. 8-10 may be implemented using machine executable instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions 800 that may be executed to implement the example edge gateway 402 of FIG. 4, the example edge switch 404 of FIG. 4, the example edge circuitry 502 of FIGS. 5 and/or 6, the example data priority control circuitry 538 of FIGS. 5 and/or 7, and/or the example data priority control circuitry 600 of FIGS. 6 and/or 7 to cause transmission of a data packet based on example data relevance model(s). The machine readable instructions 800 begin at block 802, at which the data priority control circuitry 600 may generate data relevance model(s) for data stream(s) of interest. For example, the stream configuration generator circuitry 630 (FIG. 6) may register (e.g., register as a software and/or firmware routine, register as an application programming interface (API) hook, etc.) and/or otherwise configure one(s) of the data streams 674. In some such examples, the data relevance model generator circuitry 640 (FIG. 6) may generate one or more of the data relevance models 678 (FIG. 6) for a data stream corresponding to communication between a data source and a data destination. An example process that may be executed to implement block 802 is described below in connection with FIG. 9.

At block 804, the data priority control circuitry 600 may obtain a data packet with a first priority including one or more data stream parameters. For example, the data interface 610 (FIG. 6) may obtain a first data packet from a first one of the ingress ports 534 (FIG. 5). In some such examples, the first data packet may be implemented by the first message 544 (FIG. 5), which may be transmitted from the first monitoring sensor 428 (FIG. 4), the predictive maintenance system 424 (FIG. 4), etc. In some such examples, the first one of the ingress ports 534 may store the first data packet in a buffer, in memory, etc., of the edge circuitry 502, and the data interface 610 may obtain the first data packet by duplicating and/or otherwise creating a copy of the first data packet.

At block 806, the data priority control circuitry 600 may determine whether an association of the data packet and a data stream is identified based on the one or more data stream parameters. For example, the traffic interceptor circuitry 620 (FIG. 6) may map the one or more data stream parameters to a first data stream of the data streams 674 (FIG. 6).

If, at block 806, the data priority control circuitry 600 does not determine that an association of the data packet and a data stream is identified based on the one or more data stream parameters, then, at block 808, the data priority control circuitry 600 may cause a transmission of the data packet based on the first priority. For example, the data priority control circuitry 600 may cause the first data packet to be transmitted to a data destination, which may be implemented by the fourth service 528 (FIG. 5). For example, in response to a determination that the first data packet does not correspond to one of the data streams 674, the traffic interceptor circuitry 620 may not pass the first data packet to at least one of the data relevance model generator circuitry 640 or the data priority generator circuitry 650. In some such examples, one of the egress ports 536 (FIG. 5) may transmit the first data packet based on the first priority. In response to causing the transmission of the data packet based on the first priority at block 808, the machine readable instructions 800 of FIG. 8 conclude.

If, at block 806, the data priority control circuitry 600 determines that an association of the data packet and a data stream is identified based on the one or more data stream parameters, control proceeds to block 810 to determine whether an intercept threshold is satisfied based on a number of obtained data packets of the data stream. For example, the traffic interceptor circuitry 620 may determine that the first data packet is the tenth data packet of the first data stream that is received, which may satisfy the intercept threshold of ten data packets because the traffic interceptor circuitry 620 is to identify every tenth data packet of the first data stream. In some examples, the traffic interceptor circuitry 620 may determine that the first data packet is the tenth data packet of the first data stream that is received, which may satisfy the intercept threshold of nine data packets because the traffic interceptor circuitry 620 is to increment a counter for every data packet received and to forward the data packet that exceeds the intercept threshold and reset the counter to zero.

If, at block 810, the data priority control circuitry 600 determines that the intercept threshold is not satisfied based on a number of obtained data packets of the data stream, control proceeds to block 814 to execute data relevance model(s) based on the one or more data stream parameters to generate model output(s). If, at block 810, the data priority control circuitry 600 determines that the intercept threshold is satisfied based on a number of obtained data packets of the data stream, then, at block 812, the data priority control circuitry 600 may re-train data relevance model(s) based on the data packet. For example, the traffic interceptor circuitry 620 may store the first data packet as one of the data packets 672 (FIG. 6), deliver the first data packet to the data relevance model generator circuitry 640 (FIG. 6), etc. In some such examples, the data relevance model generator circuitry 640 may train (e.g., re-train) one or more of the data relevance models 678 based on the first data packet. For example, the data relevance model generator circuitry 640 may obtain the first data packet from the data packets 672 as training data, which may be stored in the datastore 670 (FIG. 6).

At block 814, the data priority control circuitry 600 may execute data relevance model(s) based on the one or more data stream parameters to generate model output(s). For example, the data priority generator circuitry 650 (FIG. 6) may cause an execution of a first data relevance model of the data relevance models 678 that corresponds to the first data stream, which may be implemented by data communication between a data source, such as the first service 510 (FIG. 5), and a data destination, such as the fourth service 528. In some such examples, the data priority generator circuitry 650 may direct the acceleration circuitry 660 (FIG. 6) to load the first data relevance model for execution with one or more data stream parameters, the first data packet, etc., as model input(s) to generate model output(s). For example, the model output(s) may include an indicator that a video feed captures an unauthorized person, an air pollution sensor detects an abnormal spike in carbon dioxide levels, etc.

At block 816, the data priority control circuitry 600 may determine a second priority of at least one of the data packet or the data stream based on the model output(s). For example, the data priority generator circuitry 650 may obtain the model output(s) from the acceleration circuitry 660 and determine a second priority of the first data packet based on the model output(s). In some such examples, the data priority generator circuitry 650 may determine that the second priority is greater than or higher than the first priority in response to a determination that the model output(s) is/are indicative of higher priority data. In some examples, the data priority generator circuitry 650 may determine that the second priority is less than or lower than the first priority in response to a determination that the model output(s) is/are indicative of lower priority data.

At block 818, the data priority control circuitry 600 may instruct interface(s) to transmit at least one of the data packet or the data stream based on the second priority. For example, the data priority generator circuitry 650 may provide the second priority (e.g., an indication of the second priority, data representative of the second priority, etc.) to the data interface 610. In some such examples, the data interface 610 may deliver the second priority to one(s) of the egress ports 536, which may cause the one(s) of the egress ports 536 to transmit the first data packet based on the second priority and not the first priority (e.g., based on a change in priority from the first priority to the second priority). In some such examples, the one(s) of the egress ports 536 may transmit different data packets of the first data stream of the data streams 674 based on the second priority and not the first priority (e.g., based on a change in priority from the first priority to the second priority).

At block 820, the data priority control circuitry 600 may cause transmission of the at least one of the data packet or the data stream based on the second priority. For example, the data interface 610 may cause one of the egress ports 536 to transmit the first data packet based on the second priority. In some such examples, the data interface 610 may cause different data packets of the first data stream of the data streams 674 based on the second priority. Advantageously, the data priority control circuitry 600 may adjust a priority of at least one of the first data packet or the first one of the data streams 674 based on the content of the first data packet and/or the relevance of the content of the first data packet to an adjustment in data transmission and/or receiving priority. In response to causing the transmission of the data packet based on the second priority at block 820, the machine readable instructions 800 of FIG. 8 conclude.

FIG. 9 is a flowchart representative of example machine readable instructions 900 that may be executed to implement the example edge gateway 402 of FIG. 4, the example edge switch 404 of FIG. 4, the example edge circuitry 502 of FIGS. 5 and/or 6, the example data priority control circuitry 538 of FIGS. 5 and/or 7, and/or the example data priority control circuitry 600 of FIGS. 6 and/or 7 to generate example data relevance model(s) for example data stream(s) of interest. In some examples, the machine readable instructions 900 of FIG. 9 may be executed to implement block 802 of the machine readable instructions 800 of FIG. 8.

The machine readable instructions 900 of FIG. 9 begin at block 902, at which the data priority control circuitry 600 may generate an identifier for a data stream of interest. For example, the stream configuration generator circuitry 630 (FIG. 6) may generate a stream ID of S1 for a first data stream, which may be implemented by one or more data communications, messages, data packets, etc., exchanged between a data source and a data destination. In some such examples, the stream configuration generator circuitry 630 may store the identifier as one of the data stream parameters 676 (FIG. 6). In some such examples, the stream configuration generator circuitry 630 may store the identifier as corresponding to the first data stream, which may be stored as one of the data streams 674 (FIG. 6).

At block 904, the data priority control circuitry 600 may identify one or more source data stream parameters associated with the data stream. For example, the stream configuration generator circuitry 630 may identify an identifier of a source service (e.g., an identifier of the first service 510 (FIG. 5)), a source appliance (e.g., an identifier of the first platform 512 (FIG. 5)), etc., and/or a combination thereof. In some such examples, the identifier may be an IP address, an IP port, a MAC address, etc. In some such examples, the stream configuration generator circuitry 630 may store the identifier(s) as one(s) of the data stream parameters 676. In some such examples, the stream configuration generator circuitry 630 may store the identifier(s) as corresponding to the first data stream.

At block 906, the data priority control circuitry 600 may identify one or more target data stream parameters associated with the data stream. For example, the stream configuration generator circuitry 630 may identify an identifier of a target service (e.g., an identifier of the fourth service 528 (FIG. 5)), a target appliance (e.g., an identifier of the fourth platform 530 (FIG. 5)), etc., and/or a combination thereof. In some such examples, the identifier may be an IP address, an IP port, a MAC address, etc. In some such examples, the stream configuration generator circuitry 630 may store the identifier(s) as one(s) of the data stream parameters 676. In some such examples, the stream configuration generator circuitry 630 may store the identifier(s) as corresponding to the first data stream.

At block 908, the data priority control circuitry 600 may identify a data type of payload data of data packets of the data stream. For example, the stream configuration generator circuitry 630 may determine that data packets of the data stream correspond to sensor data, ambient data, etc., which may be determined based on the service, the appliance, etc., that generate the data packets. In some such examples, the stream configuration generator circuitry 630 may store the data type as one of the data stream parameters 676. In some such examples, the stream configuration generator circuitry 630 may store the data type as corresponding to the first data stream.

At block 910, the data priority control circuitry 600 may identify a definition data stream parameter including a data type definition or a formula definition. For example, the stream configuration generator circuitry 630 may identify a formula definition of compression in response to a determination that data packets of the data stream may include compressed data. In some such examples, the stream configuration generator circuitry 630 may identify a decompression technique to process the data packets. In some examples, the stream configuration generator circuitry 630 may identify a formula definition of encryption in response to a determination that data packets of the data stream may include encrypted data. In some such examples, the stream configuration generator circuitry 630 may identify a decryption technique to process the data packets. In some examples, the stream configuration generator circuitry 630 may identify a data type definition of character, integer, etc., in response to a determination that data packets of the data stream may include payload data generated based on a character, an integer, etc., data type. In some such examples, the stream configuration generator circuitry 630 may store the formula definition, the data type definition, etc., as one(s) of the data stream parameters 676. In some such examples, the stream configuration generator circuitry 630 may store the formula definition, the data type definition, etc., as corresponding to the first data stream.

At block 912, the data priority control circuitry 600 may determine at least one of bit location(s) of the data packet based on the data type definition or technique(s) based on the formula definition. For example, the stream configuration generator circuitry 630 may identify 8 bit locations of payload data of the data packets in response to a determination that the payload data is based on a character data type. In some such examples, the stream configuration generator circuitry 630 may determine to execute a decompression technique (e.g., a data decompression technique) on the identified 8 bits of the data packets, a decryption technique (e.g., a data decryption technique) on the identified 8 bits of the data packets, etc. In some such examples, the stream configuration generator circuitry 630 may store the bit location(s) as one(s) of the data stream parameters 676. In some such examples, the stream configuration generator circuitry 630 may store the bit location(s) as corresponding to the first data stream.

At block 914, the data priority control circuitry 600 may identify an intercept rate of data packets of the data stream.

For example, the stream configuration generator circuitry 630 may identify an intercept rate of every ten data packets, a time duration of every 30 seconds, etc., and/or a combination thereof. In some such examples, the stream configuration generator circuitry 630 may store the intercept rate as one of the data stream parameters 676. In some such examples, the stream configuration generator circuitry 630 may store the intercept rate as corresponding to the first data stream.

At block 916, the data priority control circuitry 600 may identify association(s) of the data stream and other data stream(s). For example, the stream configuration generator circuitry 630 may identify that the first data stream is associated, related, linked, etc., to a second data stream, a third data stream, etc. In some such examples, the stream configuration generator circuitry 630 may store the association(s) as one(s) of the data stream parameters 676. In some such examples, the stream configuration generator circuitry 630 may store the association(s) as corresponding to the first data stream.

At block 918, the data priority control circuitry 600 may generate model(s) for the data stream based on one(s) of the data stream parameter(s). For example, the data relevance model generator circuitry 640 (FIG. 6) may generate one or more of the data relevance models 678 (FIG. 6) based on the one(s) of the data stream parameters 676 that correspond to the first data stream. In some such examples, the data relevance model generator circuitry 640 may generate and/or train an AI/ML model as described herein, generate a comparison model, etc., and/or a combination thereof, based on one(s) of the data stream parameters 676 that correspond to the first data stream.

At block 920, the data priority control circuitry 600 may store association(s) of one(s) of the data stream parameters, the model(s), and the data stream. For example, the stream configuration generator circuitry 630 may store association(s) of (i) one(s) of the data stream parameters 676 that correspond to the first data stream, (ii) one(s) of the data relevance models 678 that correspond to the first data stream, and (iii) an identifier of the first data stream, and/or, more generally, the first data stream, in the datastore 670 as one of the data streams 674.

At block 922, the data priority control circuitry 600 may determine whether to select another data stream of interest to process. For example, the stream configuration generator circuitry 630 may determine to generate a stream configuration and/or otherwise configure a data stream for edge data prioritization for another data stream (e.g., a second data stream, a third data stream, etc.). If, at block 922, the data priority control circuitry 600 determines to select another data stream of interest to process, control returns to block 902 to generate an identifier for another data stream of interest, otherwise the machine readable instructions 900 of FIG. 9 conclude. For example, the machine readable instructions 900 of FIG. 9 may return to block 804 of the machine readable instructions 800 of FIG. 8 to obtain a data packet with a first priority including one or more data stream parameters.

FIG. 10 is a flowchart representative of example machine readable instructions 1000 that may be executed to implement the example edge gateway 402 of FIG. 4, the example edge switch 404 of FIG. 4, the example edge circuitry 502 of FIGS. 5 and/or 6, the example data priority control circuitry 538 of FIGS. 5 and/or 7, and/or the example data priority control circuitry 600 of FIGS. 6 and/or 7 to execute example data relevance model(s) based on one or more example data stream parameters to generate example model output(s). In some examples, the machine readable instructions 1000 of FIG. 10 may be executed to implement block 814 of the machine readable instructions 800 of FIG. 8.

The machine readable instructions 1000 of FIG. 10 begin at block 1002, at which the data priority control circuitry 600 may identify a first model corresponding to a data stream. For example, the data priority generator circuitry 650 (FIG. 6) may identify a first one of the data streams 674 (FIG. 6) in response to a determination that one or more first data parameters of the first message 544 (FIG. 5) correspond to one or more second data parameters of the first one of the data streams 674. In some such examples, the one or more second data stream parameters are included in the data stream parameters 676 (FIG. 6). In some such examples, the data priority generator circuitry 650 may identify a first one of the data relevance models 678 (FIG. 6) in response to a determination that the first one of the data streams 674 is associated with the first one of the data relevance models 678.

At block 1004, the data priority control circuitry 600 may determine whether a technique is associated with the data stream. For example, the data priority generator circuitry 650 may determine that the first one of the data streams 674 is associated with a decryption technique, a decompression technique, etc., based on a stream definition data stream parameter included in the one or more first data stream parameters and/or the one or more second data stream parameters.

If, at block 1004, the data priority control circuitry 600 determines that a technique is not associated with the data stream, control proceeds to block 1006 to determine bit location(s) of a data packet to extract as model input(s). For example, the data priority generator circuitry 650 may identify one or more bits of a data payload of the first message 544 to extract as model input(s) to the first one of the data relevance models 678. In some such examples, the one or more bits of the data payload may be representative of a sensor measurement, a process control value, an alert, a change in an environment condition, data portion(s) of a video feed, etc.

If, at block 1004, the data priority control circuitry 600 determines that a decompression technique is associated with the data stream, control proceeds to block 1008 to decompress a data payload with the technique to generate model input(s). For example, the data priority generator circuitry 650 may decompress the data payload of the first message 544 to output decompressed data, which may be provided to the first one of the data relevance models 678 as model input(s).

If, at block 1004, the data priority control circuitry 600 determines that a decryption technique is associated with the data stream, control proceeds to block 1010 to decrypt a data payload with the technique in a trusted execution environment to generate model input(s). For example, the data priority generator circuitry 650 may decrypt the data payload of the first message 544 in a TEE, a sandbox, etc., for enhanced security and/or otherwise to reduce a likelihood of being compromised. In some such examples, the data priority generator circuitry 650 may decrypt the data payload using one or more decryption techniques, algorithms, etc., to output decrypted data, which may be provided to the first one of the data relevance models 678 as model input(s).

In response to generating the model input(s) at blocks 1006, 1008, or 1010, the data priority control circuitry 600 may execute the first model with acceleration circuitry and the model input(s) to generate first model output(s) at block 1012. For example, the data priority generator circuitry 650 may invoke the acceleration circuitry 660 (FIG. 6) to load the first one of the data relevance models 678. In some such examples, the first one of the data relevance models 678 may implement a neural network (e.g., a neural network machine learning model). For example, the acceleration circuitry 660 may obtain the bit location(s) of the data payload, the decompressed data payload, and/or the decrypted data payload as model input(s) to the neural network. In some such examples, the acceleration circuitry 660 may execute the neural network with the model input(s) to generate one or more first model outputs. In some examples, the one or more first model outputs may be an identification of an alarm or alert condition, which may be indicative of raising or increasing a priority of the first message 544 and/or, more generally, subsequent messages of the corresponding data stream, from a first priority to a second priority. In some examples, the one or more first model outputs may be a priority, a change in priority, etc., associated with the first message 544 and/or, more generally, subsequent messages (e.g., messages that are received after the first message 544) of the corresponding data stream.

At block 1014, the data priority control circuitry 600 may determine a priority for the data packet based on the first model output(s). For example, the data priority generator circuitry 650 may determine that the priority of the first message 544 is to be increased from a first priority to a second priority based on the one or more first model outputs. Advantageously, in some such examples, the data priority generator circuitry 650 may determine that the first message 544 and/or, more generally, the first one of the data streams 674, is to have increased traffic priority (e.g., data traffic priority, message traffic priority, etc.) based on the content (e.g., the header, the payload, etc.) of the first message 544.

At block 1016, the data priority control circuitry 600 may identify an association of the data stream and a different data stream having a second model. For example, the data priority generator circuitry 650 may identify that the first one of the data streams 674 may be associated with a second one of the data streams 674 based on the one or more first data stream parameters and/or the one or more second data stream parameters. In some such examples, the data priority generator circuitry 650 may identify that the second one of the data streams 674 is associated with a second one of the data relevance models 678 based on the one or more first data stream parameters and/or the one or more second data stream parameters.

At block 1018, the data priority control circuitry 600 executes the second model with the acceleration circuitry based on the model input(s) to generate second model output(s). For example, the data priority generator circuitry 650 may invoke the acceleration circuitry 660 to load the second one of the data relevance models 678. In some such examples, the second one of the data relevance models 678 may implement a comparison model (e.g., a model that compares first bits and second bits). For example, the acceleration circuitry 660 may obtain the bit location(s) of the data payload, the decompressed data payload, and/or the decrypted data payload as model input(s) to the comparison model. In some such examples, the acceleration circuitry 660 may execute the comparison model with the model input(s) to generate one or more second model outputs. In some examples, the one or more second model outputs may be an identification of an alarm or alert condition, which may be indicative of raising or increasing a priority of the second message 546 and/or, more generally, subsequent messages of the corresponding data stream, from a first priority to a second priority, or reduce the priority from a third priority to a lower or reduced priority. In some examples, the one or more second model outputs may be a priority, a change in priority, etc., associated with the second message 546 and/or, more generally, subsequent messages (e.g., messages that are received after the second message 546) of the corresponding data stream.

At block 1020, the data priority control circuitry 600 may determine a priority for data packet(s) of the different data stream based on the second model output(s). For example, the data priority generator circuitry 650 may determine that the priority of the second message 546 is to be increased from a first priority to a second priority based on the one or more second model outputs. Advantageously, in some such examples, the data priority generator circuitry 650 may determine that a related message or data stream to the first message 544 may be the second message 546 and/or, more generally, the second one of the data streams 674, is to have increased traffic priority (e.g., data traffic priority, message traffic priority, etc.) based on the content (e.g., the header, the payload, etc.) of the first message 544.

In response to determining the priority for the data packet(s) of the different data stream based on the second model output(s) at block 1020, the machine readable instructions 1000 of FIG. 10 conclude. For example, the machine readable instructions 1000 of FIG. 10 may return to block 816 of the machine readable instructions 800 of FIG. 8 to determine a second priority of the data packet based on the model output(s).

Figure 11:
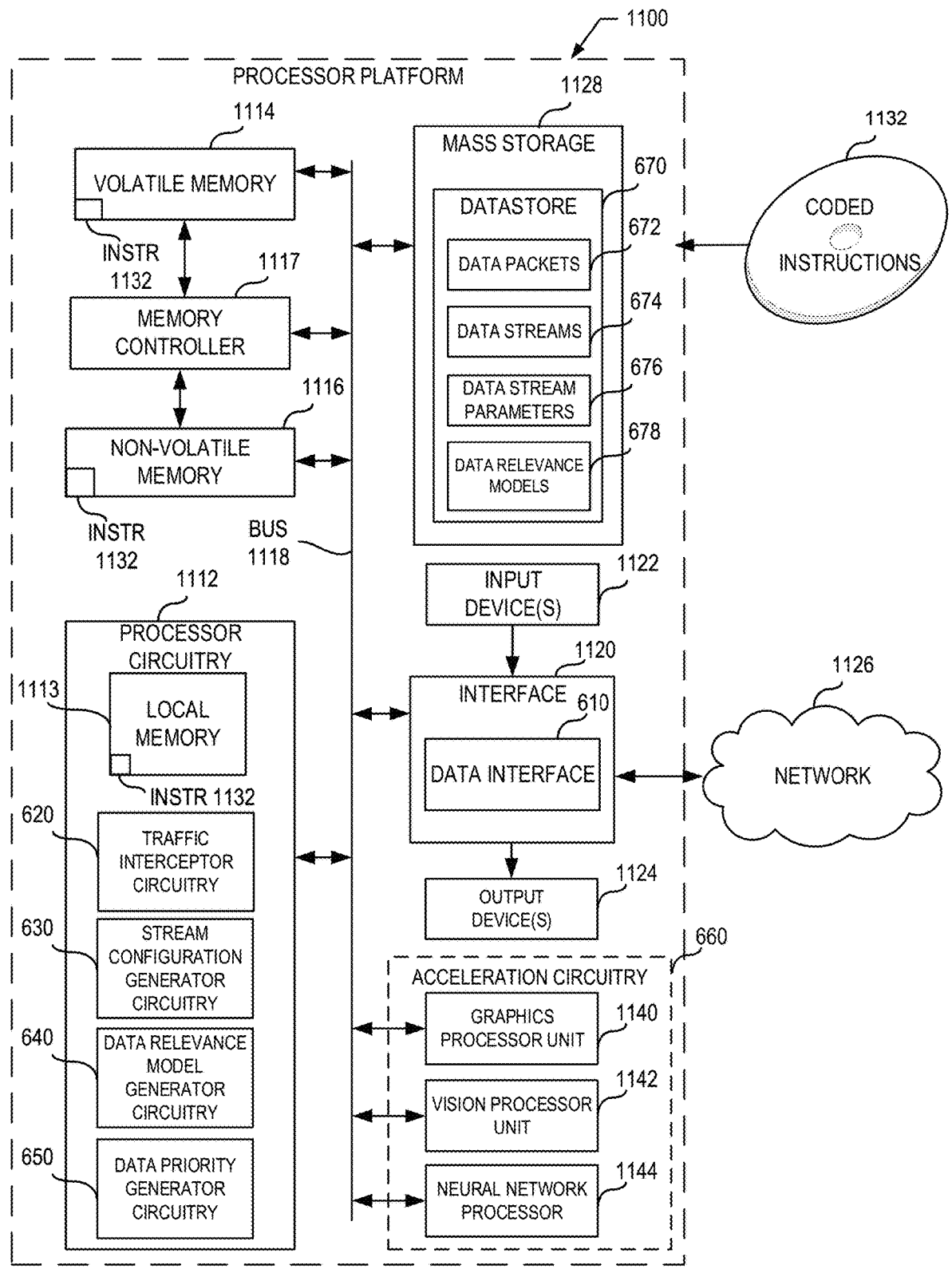
FIG. 11 is a block diagram of an example processor platform structured to execute the example machine readable instructions of FIGS. 8, 9, and/or 10 to implement the example edge gateway, and/or the example edge switch of FIGS. 4, 5, and/or 7 and/or the example data priority control circuitry of FIGS. 5, 6, and/or 7.

FIG. 11 is a block diagram of an example processor platform 1100 structured to execute the machine readable instructions of FIGS. 8-10 to implement the example edge gateway 402 of FIG. 4, the example edge circuitry 502 of FIGS. 5 and/or 6, the example edge switch 404 of FIG. 4, the example data priority control circuitry 538 of FIGS. 5 and/or 7, and/or the example data priority control circuitry 600 of FIGS. 6 and/or 7. The processor platform 1100 can be, for example, a server, a personal computer, a workstation, a self-learning machine (e.g., a neural network), an Internet appliance, a switch, a gateway, a router, a modem, an interface computing resource, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor circuitry 1112 implements the example traffic interceptor circuitry 620, the example stream configuration generator circuitry 630, the example data relevance model generator circuitry 640, and the example data priority generator circuitry 650 of FIG. 6.

The processor circuitry 1112 of the illustrated example includes a local memory 1113 (e.g., a cache). The processor circuitry 1112 of the illustrated example is in communication with a main memory including a volatile memory 1114 and a non-volatile memory 1116 via a bus 1118. The volatile memory 1114 may be implemented by SDRAM, DRAM, RDRAM®, and/or any other type of random access memory device. The non-volatile memory 1116 may be implemented by flash memory and/or any other desired type of memory device. Access to the main memory 1114, 1116 is controlled by a memory controller 1117. In this example, the bus 1118 may implement the example bus 680 of FIG. 6.

The processor platform 1100 of the illustrated example also includes an interface circuit 1120. The interface circuit 1120 may be implemented by any type of interface standard, such as an Ethernet interface, a USB, a Bluetooth® interface, an NFC interface, and/or a PCI express interface.

In the illustrated example, one or more input devices 1122 are connected to the interface circuit 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1120 implements the example data interface 610 of FIG. 6.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and DVD drives. In this example, the one or more mass storage devices 1128 implements the example datastore 670 of FIG. 6, which may store the example data packets 672, the example data streams 674, the example data stream parameters 676, and the example data relevance models 678 of FIG. 6.

The machine executable instructions 1132 of FIGS. 8-10 may be stored in the mass storage device 1128, in the volatile memory 1114, in the non-volatile memory 1116, and/or on a removable non-transitory computer readable storage medium such as a CD or DVD.

The processor platform 1100 of the illustrated example of FIG. 11 includes an example graphics processor unit (GPU) 1140, an example vision processor unit (VPU) 1142, and an example neural network processor 1144. In this example, the GPU 1140, the VPU 1142, and the neural network processor 1144 are in communication with different hardware of the processor platform 1100, such as the volatile memory 1114, the non-volatile memory 1116, etc., via the bus 1118. In this example, the neural network processor 1144 may be implemented by one or more integrated circuits, logic circuits, microprocessors, GPUs, DSPs, or controllers from any desired family or manufacturer that can be used to execute an AI model, such as a neural network, which may be implemented by the data relevance models 678. In some examples, one or more of example traffic interceptor circuitry 620, the example stream configuration generator circuitry 630, the example data relevance model generator circuitry 640, and/or the example data priority generator circuitry 650 of FIG. 6 can be implemented in or with at least one of the GPU 1140, the VPU 1142, or the neural network processor 1144 instead of or in addition to the processor circuitry 1112.

In some examples, the GPU 1140 may implement the acceleration circuitry 542 of FIGS. 5 and/or 7 and/or the acceleration circuitry 660 of FIGS. 6 and/or 7. In some examples, the VPU 1142 may implement the acceleration circuitry 542 of FIGS. 5 and/or 7 and/or the acceleration circuitry 660 of FIGS. 6 and/or 7. In some examples, the neural network processor 1144 may implement the acceleration circuitry 542 of FIGS. 5 and/or 7 and/or the acceleration circuitry 660 of FIGS. 6 and/or 7.

Figure 12:
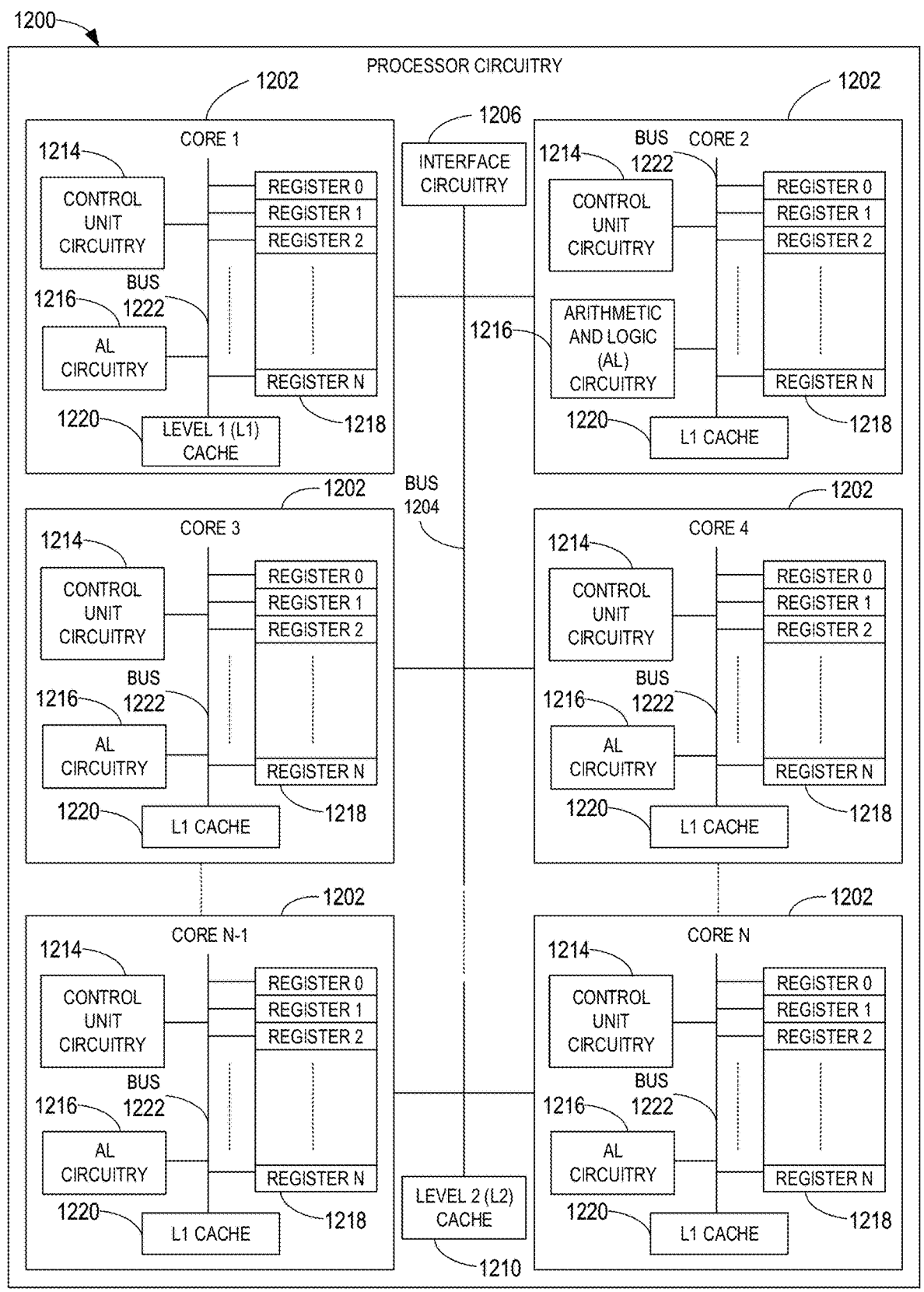
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIG. 8-10.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1220 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
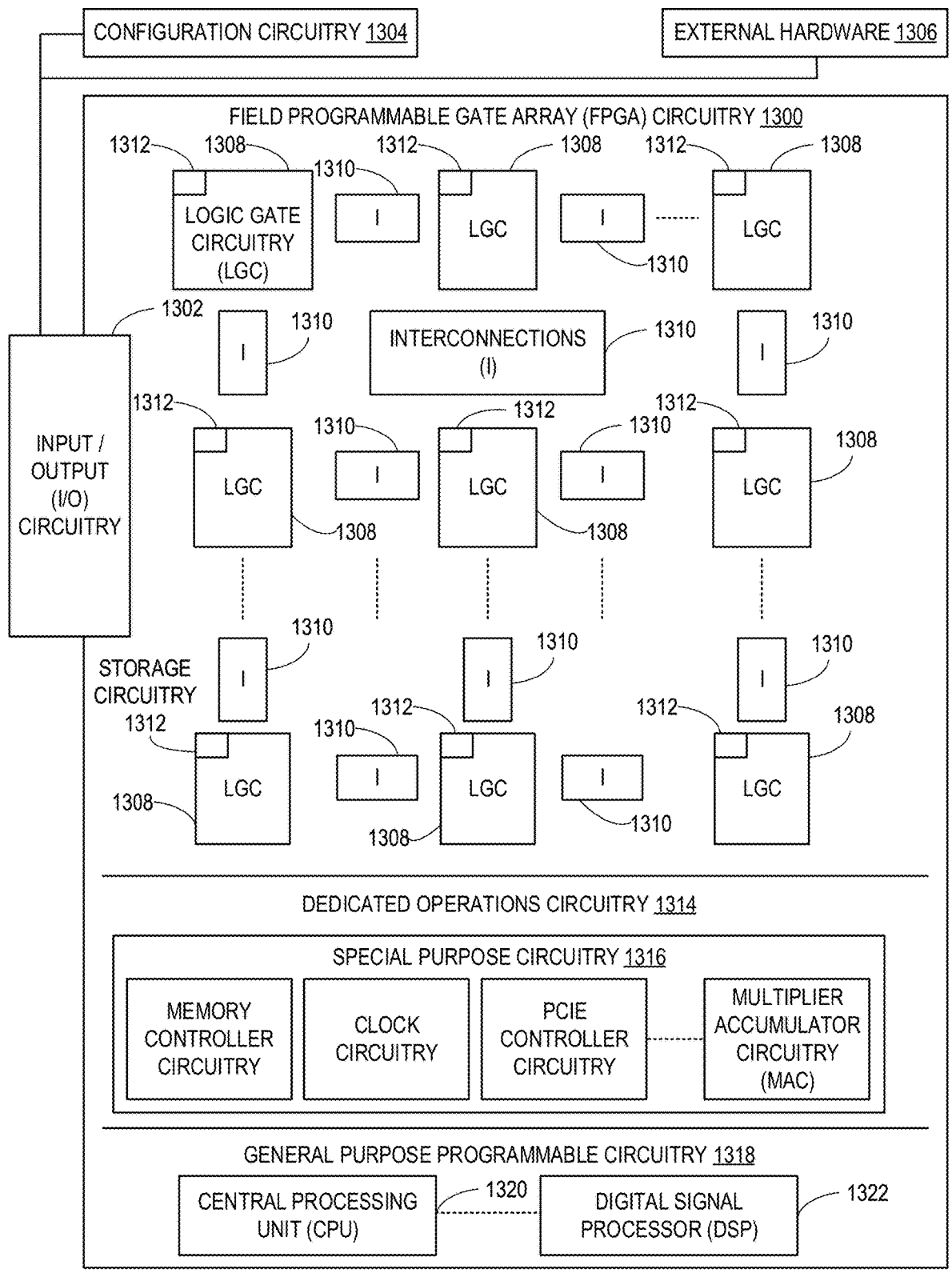
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIG. 8-10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIG. 8-10. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIG. 8-10. As such, the FPGA circuitry 1300 may be structured to effectively instantiate some or all of the machine readable instructions of the flowcharts of FIG. 8-10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 8-10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIG. \_\_\_\_\_ and/or other desired operations. The logic gate circuitry1 308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIG. 8-10 may be executed by one or more of the cores 1202 of FIG. 12 and a second portion of the machine readable instructions represented by the flowcharts of FIG. 8-10 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
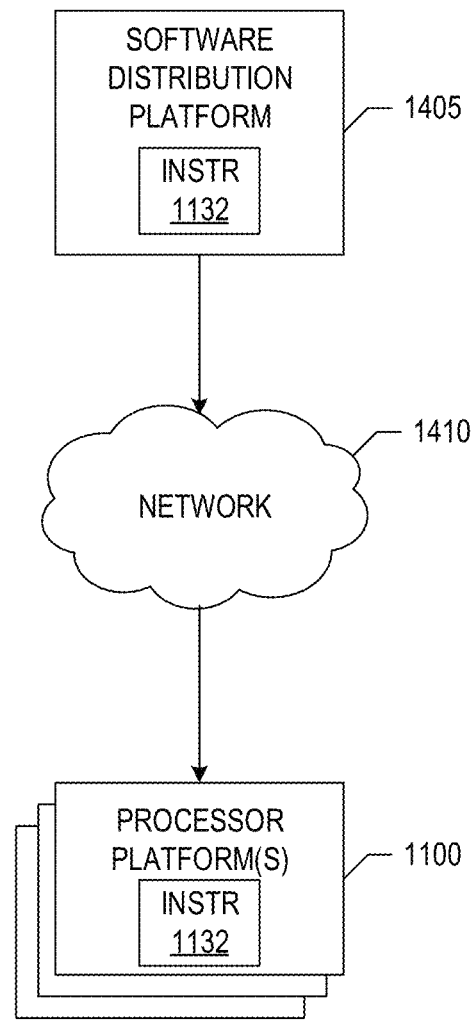
FIG. 14 is a block diagram of an example software distribution platform to distribute software to example client devices, example retailers, and/or example original equipment manufacturers (OEMs).

FIG. 14 is a block diagram of an example software distribution platform 1405 to distribute software (e.g., software corresponding to the example machine readable instructions of FIGS. 8-10) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers). The example software distribution platform 1405 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 800, 900, 1000 of FIGS. 8-10, as described above. The one or more servers of the example software distribution platform 1405 are in communication with a network 1410, which may correspond to any one or more of the Internet and/or any of the example networks described above, which may include the example network 1126 of FIG. 11. In some examples, the one or more servers are responsive to requests to transmit the software to a requesting party as part of a commercial transaction. Payment for the delivery, sale, and/or license of the software may be handled by the one or more servers of the software distribution platform and/or via a third party payment entity. The servers enable purchasers and/or licensors to download the machine readable instructions 1132 from the software distribution platform 1405. For example, the software, which may correspond to the example machine readable instructions 800, 900, 1000 of FIGS. 8-10, may be downloaded to the example processor platform 1400, which is to execute the machine readable instructions 1132 to implement the example edge gateway 402 of FIG. 4, the example edge switch 404 of FIG. 4, the example edge circuitry 502 of FIGS. 5 and/or 7, the example data priority control circuitry 538 of FIGS. 5 and/or 7, and/or the example data priority control circuitry 600 of FIGS. 6 and/or 7. In some example, one or more servers of the software distribution platform 1405 periodically offer, transmit, and/or force updates to the software (e.g., the example machine readable instructions 1132 of FIG. 11) to ensure improvements, patches, updates, etc. are distributed and applied to the software at the end user devices.

From the foregoing, it will be appreciated that example systems, methods, apparatus, and articles of manufacture have been disclosed that implement adaptive packet prioritization based on global observability at the edge. Example systems, methods, apparatus, and articles of manufacture may implement improved techniques for facilitating data communication with low latency requirements. Advantageously, example systems, methods, apparatus, and articles of manufacture may determine whether data is to have increased priority (or decreased priority) based on data content to enable an edge infrastructure to scale and process larger volumes of sensor and IoT edge data. Advantageously, the disclosed systems, methods, apparatus, and articles of manufacture improve the efficiency of using a computing device by optimizing and/or otherwise improving the transmission of data in response to determining priority based on global observability at the edge. The disclosed methods, apparatus and articles of manufacture are accordingly directed to one or more improvement(s) in the functioning of a computer.

Example methods, apparatus, systems, and articles of manufacture for prioritization of traffic in an edge network environment are disclosed herein. Further examples and combinations thereof include the following:

Example 1 includes an apparatus to prioritize data traffic in an edge network environment, the apparatus comprising at least one memory, instructions, and processor circuitry to at least one of execute or instantiate the instructions to identify an association of a data packet with a data stream based on one or more data stream parameters included in the data packet, the one or more data stream parameters corresponding to the data stream, the data packet associated with a first priority, execute a model based on the one or more data stream parameters to generate a model output, determine a second priority of at least one of the data packet or the data stream based on the model output, the model output indicative of an adjustment of the first priority to the second priority, and cause transmission of at least one of the data packet or the data stream based on the second priority.

In Example 2, the subject matter of Example 1 can optionally include that the data packet is a first data packet, the data stream is a first data stream, and, in response to a determination that a second data packet with a third priority is not associated with the first data stream or one or more second data streams, the processor circuitry is to cause transmission of the second data packet based on the third priority.

In Example 3, the subject matter of Examples 1-2 can optionally include that the processor circuitry is to determine whether a threshold has been satisfied based on a number of obtained data packets of the data stream, and in response to a determination that the threshold has been satisfied, re-train the model based on the one or more data stream parameters.

In Example 4, the subject matter of Examples 1-3 can optionally include that the one or more data stream parameters are one or more first data stream parameters, and the processor circuitry is to identify one or more source data stream parameters including at least one of a source service or a source appliance associated with the data stream, identify one or more target data stream parameters including at least one of a target service, a target appliance, a first identifier of the target service, or a second identifier of the target appliance associated with the data stream, identify a data type of payload data of the data packet, the model based on at least one of the one or more data stream parameters, the one or more target data stream parameters, or the data type, and cause storage of at least one of the one or more source data stream parameters, the one or more target data stream parameters, or the data type as second data stream parameters, the second data stream parameters including the one or more first data stream parameters.

In Example 5, the subject matter of Examples 1-4 can optionally include that the processor circuitry is to identify a definition data stream parameter including a data type definition or a formula definition, in response to a first identification of the definition data stream parameter as the data type definition, determine one or more bit locations of a bit stream of the data packet to extract, the execution of the model based on the one or more bit locations to extract, and in response to a second identification of the definition data stream parameter as the formula definition based on a compression or encryption of the bit stream, determine a decompression technique or a decryption technique, the execution of the model based on the decompression technique or the decryption technique.

In Example 6, the subject matter of Examples 1-5 can optionally include that the association is a first association, and the processor circuitry is to identify a second association of the one or more data stream parameters and a decryption technique, and decrypt the one or more data stream parameters in a trusted execution environment, the execution of the model based on the decryption of the one or more data stream parameters.

In Example 7, the subject matter of Examples 1-6 can optionally include that the association is a first association, the data packet is a first data packet, the data stream is a first data stream, the model is a first model, the model output is a first model output, and the processor circuitry is to identify a second association of the first data stream and a second data stream, execute a second model based on the one or more data stream parameters to generate a second model output, the second model associated with the second data stream, and determine a third priority of a second data packet based on the second model output, the second data packet obtained after the first data packet.

Example 8 includes an apparatus to prioritize data traffic in an edge network environment, the apparatus comprising means for identifying an association of a data packet with a data stream based on one or more data stream parameters included in the data packet, the one or more data stream parameters corresponding to the data stream, the data packet associated with a first priority, means for executing a model based on the one or more data stream parameters to generate a model output, means for determining a second priority of at least one of the data packet or the data stream based on the model output, the model output indicative of an adjustment of the first priority to the second priority, and means for transmitting at least one of the data packet or the data stream based on the second priority.

In Example 9, the subject matter of Example 8 can optionally include that the data packet is a first data packet, the data stream is a first data stream, and, in response to a determination that a second data packet with a third priority is not associated with the first data stream or one or more second data streams, the means for transmitting is to transmit the second data packet based on the third priority.

In Example 10, the subject matter of Examples 8-9 can optionally include that the means for identifying is to determine whether a threshold has been satisfied based on a number of obtained data packets of the data stream, and further including means for training the model based on the one or more data stream parameters in response to a determination that the threshold has been satisfied.

In Example 11, the subject matter of Examples 8-10 can optionally include that the one or more data stream parameters are one or more first data stream parameters, and further including means for configuring the data stream, the means for configuring to identify one or more source data stream parameters including at least one of a source service or a source appliance associated with the data stream, identify one or more target data stream parameters including at least one of a target service, a target appliance, a first identifier of the target service, or a second identifier of the target appliance associated with the data stream, identify a data type of payload data of the data packet, the model based on at least one of the one or more data stream parameters, the one or more target data stream parameters, or the data type, and cause storage of at least one of the one or more source data stream parameters, the one or more target data stream parameters, or the data type as second data stream parameters, the second data stream parameters including the one or more first data stream parameters, the means for configuring to configure the data stream based on the at least one of the one or more source data stream parameters, the one or more target data stream parameters, or the data type.

In Example 12, the subject matter of Examples 8-11 can optionally include means for configuring the data stream, the means for configuring to identify a definition data stream parameter including a data type definition or a formula definition, in response to a first identification of the definition data stream parameter as the data type definition, determine one or more bit locations of a bit stream of the data packet to extract, the execution of the model based on the one or more bit locations to extract, and in response to a second identification of the definition data stream parameter as the formula definition based on a compression or encryption of the bit stream, determine a decompression technique or a decryption technique, the execution of the model based on the decompression technique or the decryption technique.

In Example 13, the subject matter of Examples 8-12 can optionally include that the association is a first association, and the means for determining is to identify a second association of the one or more data stream parameters and a decryption technique, and decrypt the one or more data stream parameters in a trusted execution environment, the execution of the model based on the decryption of the one or more data stream parameters.

In Example 14, the subject matter of Examples 8-13 can optionally include that the association is a first association, the data packet is a first data packet, the data stream is a first data stream, the model is a first model, the model output is a first model output, and wherein the means for determining is to identify a second association of the first data stream and a second data stream, the means for executing is to execute a second model based on the one or more data stream parameters to generate a second model output, the second model associated with the second data stream, and the means for determining is to determine a third priority of a second data packet based on the second model output, the second data packet obtained after the first data packet.

Example 15 includes at least one non-transitory computer readable medium comprising instructions that, when executed, cause processor circuitry to at least identify an association of a data packet with a data stream based on one or more data stream parameters included in the data packet, the one or more data stream parameters corresponding to the data stream, the data packet associated with a first priority, execute a model based on the one or more data stream parameters to generate a model output, determine a second priority of at least one of the data packet or the data stream based on the model output, the model output indicative of an adjustment of the first priority to the second priority, and cause transmission of at least one of the data packet or the data stream based on the second priority.

In Example 16, the subject matter of Example 15 can optionally include that the data packet is a first data packet, the data stream is a first data stream, and, in response to a determination that a second data packet with a third priority is not associated with the first data stream or one or more second data streams, the instructions, when executed, cause the processor circuitry to cause transmission of the second data packet based on the third priority.

In Example 17, the subject matter of Examples 15-16 can optionally include that the instructions, when executed, cause the processor circuitry to determine whether a threshold has been satisfied based on a number of obtained data packets of the data stream, and in response to a determination that the threshold has been satisfied, re-train the model based on the one or more data stream parameters.

In Example 18, the subject matter of Examples 15-17 can optionally include that the one or more data stream parameters are one or more first data stream parameters, and the instructions, when executed, cause the processor circuitry to identify one or more source data stream parameters including at least one of a source service or a source appliance associated with the data stream, identify one or more target data stream parameters including at least one of a target service, a target appliance, a first identifier of the target service, or a second identifier of the target appliance associated with the data stream, identify a data type of payload data of the data packet, the model based on at least one of the one or more data stream parameters, the one or more target data stream parameters, or the data type, and cause storage of at least one of the one or more source data stream parameters, the one or more target data stream parameters, or the data type as second data stream parameters, the second data stream parameters including the one or more first data stream parameters.

In Example 19, the subject matter of Examples 15-18 can optionally include that the instructions, when executed, cause the processor circuitry to identify a definition data stream parameter including a data type definition or a formula definition, in response to a first identification of the definition data stream parameter as the data type definition, determine one or more bit locations of a bit stream of the data packet to extract, the execution of the model based on the one or more bit locations to extract, and in response to a second identification of the definition data stream parameter as the formula definition based on a compression or encryption of the bit stream, determine a decompression technique or a decryption technique, the execution of the model based on the decompression technique or the decryption technique.

In Example 20, the subject matter of Examples 15-19 can optionally include that the association is a first association, and the instructions, when executed, cause the processor circuitry to identify a second association of the one or more data stream parameters and a decryption technique, and decrypt the one or more data stream parameters in a trusted execution environment, the execution of the model based on the decryption of the one or more data stream parameters.

In Example 21, the subject matter of Examples 15-20 can optionally include that the association is a first association, the data packet is a first data packet, the data stream is a first data stream, the model is a first model, the model output is a first model output, and the instructions, when executed, cause the processor circuitry to identify a second association of the first data stream and a second data stream, execute a second model based on the one or more data stream parameters to generate a second model output, the second model associated with the second data stream, and determine a third priority of a second data packet based on the second model output, the second data packet obtained after the first data packet.

Example 22 includes an apparatus to prioritize data traffic in an edge network environment, the apparatus comprising processor circuitry including one or more of at least one of a central processor unit, a graphic processor unit, or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate traffic interceptor circuitry to identify an association of a data packet with a data stream based on one or more data stream parameters included in the data packet, the one or more data stream parameters corresponding to the data stream, the data packet associated with a first priority, and data priority generator circuitry to determine a second priority of at least one of the data packet or the data stream based on a model output, the model output indicative of an adjustment of the first priority to the second priority, acceleration circuitry to execute a model based on the one or more data stream parameters to generate the model output, and a data interface to transmit at least one of the data packet or the data stream based on the second priority.

In Example 23, the subject matter of Example 22 can optionally include that the data packet is a first data packet, the data stream is a first data stream, and, in response to a determination that a second data packet with a third priority is not associated with the first data stream or one or more second data streams, the data interface is to cause transmission of the second data packet based on the third priority.

In Example 24, the subject matter of Examples 22-23 can optionally include that the traffic interceptor circuitry is to determine whether a threshold has been satisfied based on a number of obtained data packets of the data stream, and the processor circuitry is to perform at least one of the first operations, the second operations, or the third operations to instantiate data relevance model generator circuitry to re-train the model based on the one or more data stream parameters in response to a determination that the threshold has been satisfied.

In Example 25, the subject matter of Examples 22-24 can optionally include that the one or more data stream parameters are one or more first data stream parameters, the processor circuitry is to perform at least one of the first operations, the second operations, or the third operations to instantiate stream configuration generator circuitry to configure the data stream, and the stream configuration generator circuitry is to identify one or more source data stream parameters including at least one of a source service or a source appliance associated with the data stream, identify one or more target data stream parameters including at least one of a target service, a target appliance, a first identifier of the target service, or a second identifier of the target appliance associated with the data stream, identify a data type of payload data of the data packet, the model based on at least one of the one or more data stream parameters, the one or more target data stream parameters, or the data type, and cause storage of at least one of the one or more source data stream parameters, the one or more target data stream parameters, or the data type as second data stream parameters, the second data stream parameters including the one or more first data stream parameters, the stream configuration generator circuitry to configure the data stream based on the at least one of the one or more source data stream parameters, the one or more target data stream parameters, or the data type.

In Example 26, the subject matter of Examples 22-25 can optionally include that the processor circuitry is to perform at least one of the first operations, the second operations, or the third operations to instantiate stream configuration generator circuitry to identify a definition data stream parameter including a data type definition or a formula definition, in response to a first identification of the definition data stream parameter as the data type definition, determine one or more bit locations of a bit stream of the data packet to extract, the execution of the model based on the one or more bit locations to extract, and in response to a second identification of the definition data stream parameter as the formula definition based on a compression or encryption of the bit stream, determine a decompression technique or a decryption technique, the execution of the model based on the decompression technique or the decryption technique.

In Example 27, the subject matter of Examples 22-26 can optionally include that the association is a first association, and the data priority generator circuitry is to identify a second association of the one or more data stream parameters and a decryption technique, and decrypt the one or more data stream parameters in a trusted execution environment, the execution of the model based on the decryption of the one or more data stream parameters.

In Example 28, the subject matter of Examples 22-27 can optionally include that the association is a first association, the data packet is a first data packet, the data stream is a first data stream, the model is a first model, the model output is a first model output, and wherein the data priority generator circuitry is to identify a second association of the first data stream and a second data stream, the acceleration circuitry is to execute a second model based on the one or more data stream parameters to generate a second model output, the second model associated with the second data stream, and the data priority generator circuitry is to determine a third priority of a second data packet based on the second model output, the second data packet obtained after the first data packet.

Example 29 includes a method for prioritizing data traffic in an edge network environment, the method comprising identifying, by processor circuitry executing an operation, an association of a data packet with a data stream based on one or more data stream parameters included in the data packet, the one or more data stream parameters corresponding to the data stream, the data packet associated with a first priority, executing a model based on the one or more data stream parameters to generate a model output, determining, by the processor circuitry executing an operation, a second priority of at least one of the data packet or the data stream based on the model output, the model output indicative of adjusting the first priority of the at least one of the data packet or the data stream to the second priority, and causing transmission of the at least one of the data packet or the data stream based on the second priority.

In Example 30, the subject matter of Example 29 can optionally include that the data packet is a first data packet, the data stream is a first data stream, and further including, in response to determining a second data packet with a third priority is not associated with the first data stream or one or more second data streams, causing transmission of the second data packet based on the third priority.

In Example 31, the subject matter of Examples 29-30 can optionally include determining whether a threshold has been satisfied based on a number of obtained data packets of the data stream, and in response to determining that the threshold has been satisfied, re-training the model based on the one or more data stream parameters.

In Example 32, the subject matter of Examples 29-31 can optionally include that the one or more data stream parameters are one or more first data stream parameters, and further including identifying one or more source data stream parameters including at least one of a source service or a source appliance associated with the data stream, identifying one or more target data stream parameters including at least one of a target service, a target appliance, a first identifier of the target service, or a second identifier of the target appliance associated with the data stream, identifying a data type of payload data of the data packet, the model based on at least one of the one or more data stream parameters, the one or more target data stream parameters, or the data type, and cause storing of at least one of the one or more source data stream parameters, the one or more target data stream parameters, or the data type as second data stream parameters, the second data stream parameters including the one or more first data stream parameters.

In Example 33, the subject matter of Examples 29-32 can optionally include identifying a definition data stream parameter including a data type definition or a formula definition, in response to identifying the definition data stream parameter as the data type definition, determining one or more bit locations of a bit stream of the data packet to extract, the executing of the model based on the one or more bit locations to extract, and in response to identifying the definition data stream parameter as the formula definition based on a compression or encryption of the bit stream, determining a decompression technique or a decryption technique, the executing of the model based on the decompression technique or the decryption technique.

In Example 34, the subject matter of Examples 29-33 can optionally include that the association is a first association, and further including identifying a second association of the one or more data stream parameters and a decryption technique, and decrypting the one or more data stream parameters in a trusted execution environment, the executing of the model based on the decryption of the one or more data stream parameters.

In Example 35, the subject matter of Examples 29-34 can optionally include that the association is a first association, the data packet is a first data packet, the data stream is a first data stream, the model is a first model, the model output is a first model output, and further including identifying a second association of the first data stream and a second data stream, executing a second model based on the one or more data stream parameters to generate a second model output, the second model associated with the second data stream, and determining a third priority of a second data packet based on the second model output, the second data packet obtained after the first data packet.

Example 36 is at least one computer readable medium comprising instructions to perform the method of any of Examples 29-35.

Example 37 is an apparatus comprising processor circuitry to perform the method of any of Examples 29-35.

Example 38 is an apparatus comprising accelerator circuitry to perform the method of any of Examples 29-35.

Example 39 is an apparatus comprising one or more graphics processor units to perform the method of any of Examples 29-35.

Example 40 is an apparatus comprising one or more vision processor units to perform the method of any of Examples 29-35.

Example 41 is an apparatus comprising one or more neural network processors to perform the method of any of Examples 29-35.

Example 42 is an apparatus comprising one or more machine learning processors to perform the method of any of Examples 29-35.

Example 43 is an apparatus comprising one or more general purpose processors to perform the method of any of Examples 29-35.

Example 44 is an apparatus comprising one or more digital signal processors to perform the method of any of Examples 29-35.

Example 45 is an edge server comprising at least one of processor circuitry or accelerator circuitry to perform the method of any of Examples 29-35.

Example 46 is an edge cloud comprising at least one of processor circuitry or accelerator circuitry to perform the method of any of Examples 29-35.

Example 47 is an edge node comprising at least one of processor circuitry or accelerator circuitry to perform the method of any of Examples 29-35.

Example 48 is an apparatus comprising one or more edge gateways to perform the method of any of Examples 29-35.

Example 49 is an apparatus comprising one or more edge switches to perform the method of any of Examples 29-35.

Example 50 is an apparatus comprising at least one of one or more edge gateways or one or more edge switches to perform the method of any of Examples 29-35.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to prioritize data traffic in an edge network environment, the apparatus comprising:
at least one memory;
instructions; and
processor circuitry to at least one of execute or instantiate the instructions to:
identify an association of a data packet with a data stream based on one or more data stream parameters included in the data packet, the one or more data stream parameters corresponding to the data stream, the data packet associated with a first priority;
select a model based on the association of the data packet with the data stream;
execute the model using information corresponding to at least one of the data packet or the data stream to generate a model output;
determine a second priority of at least one of the data packet or the data stream based on the model output, the second priority different than the first priority; and
cause transmission of at least one of the data packet or the data stream based on the second priority.

2. The apparatus of claim 1, wherein the data packet is a first data packet, the data stream is a first data stream, and, based on a determination that a second data packet with a third priority is not associated with the first data stream or one or more second data streams, the processor circuitry is to cause transmission of the second data packet based on the third priority.

3. The apparatus of claim 1, wherein the processor circuitry is to:
- determine whether a threshold has been satisfied based on a number of obtained data packets of the data stream; and
- based on the threshold being satisfied, re-train the model based on the one or more data stream parameters.

4. The apparatus of claim 1, wherein the one or more data stream parameters are one or more first data stream parameters, and the processor circuitry is to:
- identify one or more source data stream parameters including at least one of a source service or a source appliance associated with the data stream;
- identify one or more target data stream parameters including at least one of a target service, a target appliance, a first identifier of the target service, or a second identifier of the target appliance associated with the data stream;
- identify a data type of payload data of the data packet, the model based on at least one of the one or more data stream parameters, the one or more target data stream parameters, or the data type; and
- cause storage of at least one of the one or more source data stream parameters, the one or more target data stream parameters, or the data type as second data stream parameters, the second data stream parameters including the one or more first data stream parameters.

5. The apparatus of claim 1, wherein the processor circuitry is to:
- identify a definition data stream parameter including a data type definition or a formula definition;
- after a first identification of the definition data stream parameter as the data type definition, determine one or more bit locations of a bit stream of the data packet to extract, the execution of the model based on the one or more bit locations to extract; and
- after a second identification of the definition data stream parameter as the formula definition based on a compression or encryption of the bit stream, determine a decompression technique or a decryption technique, the execution of the model based on the decompression technique or the decryption technique.

6. The apparatus of claim 1, wherein the association is a first association, and the processor circuitry is to:
- identify a second association of the one or more data stream parameters and a decryption technique; and
- decrypt the one or more data stream parameters in a trusted execution environment, the execution of the model based on the decryption of the one or more data stream parameters.

7. The apparatus of claim 1, wherein the association is a first association, the data packet is a first data packet, the data stream is a first data stream, the model is a first model, the model output is a first model output, and the processor circuitry is to:
- identify a second association of the first data stream and a second data stream;
- execute a second model based on the one or more data stream parameters to generate a second model output, the second model associated with the second data stream; and
- determine a third priority of a second data packet based on the second model output, the second data packet obtained after the first data packet.

8. An apparatus to prioritize data traffic in an edge network environment, the apparatus comprising:
- means for identifying an association of a data packet with a data stream based on one or more data stream parameters included in the data packet, the one or more data stream parameters corresponding to the data stream, the data packet associated with a first priority;
- means for executing a model using information corresponding to at least one of the data packet or the data stream to generate a model output, the model selected based on the association of the data packet with the data stream;
- means for adjusting the first priority of the data packet to a second priority of at least one of the data packet based on the model output, the second priority different than the first priority; and
- means for transmitting at least one of the data packet or the data stream based on the second priority.

9. The apparatus of claim 8, wherein the data packet is a first data packet, the data stream is a first data stream, and, based on a determination that a second data packet with a third priority is not associated with the first data stream or one or more second data streams, the means for transmitting is to transmit the second data packet based on the third priority.

10. The apparatus of claim 8, wherein the means for identifying is to determine whether a threshold has been satisfied based on a number of obtained data packets of the data stream, and further including means for training the model based on the one or more data stream parameters based on a determination that the threshold has been satisfied.

11. The apparatus of claim 8, wherein the one or more data stream parameters are one or more first data stream parameters, and further including means for configuring the data stream, the means for configuring to:
- identify one or more source data stream parameters including at least one of a source service or a source appliance associated with the data stream;
- identify one or more target data stream parameters including at least one of a target service, a target appliance, a first identifier of the target service, or a second identifier of the target appliance associated with the data stream;
- identify a data type of payload data of the data packet, the model based on at least one of the one or more data stream parameters, the one or more target data stream parameters, or the data type; and
- cause storage of at least one of the one or more source data stream parameters, the one or more target data stream parameters, or the data type as second data stream parameters, the second data stream parameters including the one or more first data stream parameters, the means for configuring to configure the data stream based on the at least one of the one or more source data stream parameters, the one or more target data stream parameters, or the data type.

12. The apparatus of claim 8, further including means for configuring the data stream, the means for configuring to:
- identify a definition data stream parameter including a data type definition or a formula definition;
- after a first identification of the definition data stream parameter as the data type definition, determine one or more bit locations of a bit stream of the data packet to extract, the execution of the model based on the one or more bit locations to extract; and
- after a second identification of the definition data stream parameter as the formula definition based on a compression or encryption of the bit stream, determine a decompression technique or a decryption technique, the execution of the model based on the decompression technique or the decryption technique.

13. The apparatus of claim 8, wherein the association is a first association, the data packet is a first data packet, the data stream is a first data stream, the model is a first model, the model output is a first model output, and wherein:
the means for adjusting is to identify a second association of the first data stream and a second data stream;
the means for executing is to execute a second model based on the one or more data stream parameters to generate a second model output, the second model associated with the second data stream; and
the means for adjusting is to determine a third priority of a second data packet based on the second model output, the second data packet obtained after the first data packet.

14. At least one non-transitory computer readable medium comprising instructions that cause processor circuitry to at least:
identify a data stream based on one or more data stream parameters included in a received data packet, the one or more data stream parameters corresponding to the data stream, the data packet associated with a first priority;
select a model based on the identified data stream;
execute the model using information corresponding to at least one of the data packet or the data stream to generate a model output;
change the first priority of the packet to a second priority based on the model output, the second priority different than the first priority; and
cause transmission the data packet based on the second priority.

15. The at least one non-transitory computer readable medium of claim 14, wherein the data packet is a first data packet, the data stream is a first data stream, and, based on a determination that a second data packet with a third priority is not associated with the first data stream or one or more second data streams, the instructions, when executed, cause the processor circuitry to cause transmission of the second data packet based on the third priority.

16. The at least one non-transitory computer readable medium of claim 14, wherein the instructions, when executed, cause the processor circuitry to:
determine whether a threshold has been satisfied based on a number of obtained data packets of the data stream; and
based on the threshold being satisfied, re-train the model based on the one or more data stream parameters.

17. The at least one non-transitory computer readable medium of claim 14, wherein the one or more data stream parameters are one or more first data stream parameters, and the instructions, when executed, cause the processor circuitry to:
identify one or more source data stream parameters including at least one of a source service or a source appliance associated with the data stream;
identify one or more target data stream parameters including at least one of a target service, a target appliance, a first identifier of the target service, or a second identifier of the target appliance associated with the data stream;
identify a data type of payload data of the data packet, the model based on at least one of the one or more data stream parameters, the one or more target data stream parameters, or the data type; and cause storage of at least one of the one or more source data stream parameters, the one or more target data stream parameters, or the data type as second data stream parameters, the second data stream parameters including the one or more first data stream parameters.

18. The at least one non-transitory computer readable medium of claim 14, wherein the instructions, when executed, cause the processor circuitry to:
identify a definition data stream parameter including a data type definition or a formula definition;
after a first identification of the definition data stream parameter as the data type definition, determine one or more bit locations of a bit stream of the data packet to extract, the execution of the model based on the one or more bit locations to extract; and
after a second identification of the definition data stream parameter as the formula definition based on a compression or encryption of the bit stream, determine a decompression technique or a decryption technique, the execution of the model based on the decompression technique or the decryption technique.

19. The at least one non-transitory computer readable medium of claim 14, wherein the association is a first association, and the instructions, when executed, cause the processor circuitry to:
identify a second association of the one or more data stream parameters and a decryption technique; and
decrypt the one or more data stream parameters in a trusted execution environment, the execution of the model based on the decryption of the one or more data stream parameters.

20. The at least one non-transitory computer readable medium of claim 14, wherein the association is a first association, the data packet is a first data packet, the data stream is a first data stream, the model is a first model, the model output is a first model output, and the instructions, when executed, cause the processor circuitry to:
identify a second association of the first data stream and a second data stream;
execute a second model based on the one or more data stream parameters to generate a second model output, the second model associated with the second data stream; and
determine a third priority of a second data packet based on the second model output, the second data packet obtained after the first data packet.

21. An apparatus to prioritize data traffic in an edge network environment, the apparatus comprising:
processor circuitry including one or more of:
at least one of a central processor unit, a graphic processor unit, or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;
a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrated Circuitry (ASIC) including logic gate circuitry to perform one or more third operations;

the processor circuitry to perform at least one of the first operations, the second operations, or the third operations to instantiate:

traffic interceptor circuitry to identify an association of a data packet with a data stream based on one or more data stream parameters included in the data packet, the one or more data stream parameters corresponding to the data stream, the data packet associated with a first priority; and data priority generator circuitry to:
identify a model based on the association of the data packet with the data stream; and
change the first priority of at least one of the data packet or the data stream to a second priority based on a model output, the second priority different than the first priority;

acceleration circuitry to execute the model using information corresponding to at least one of the data packet or the data stream to generate the model output; and a data interface to transmit at least one of the data packet or the data stream based on the second priority.

22. The apparatus of claim 21, wherein the one or more data stream parameters are one or more first data stream parameters, the processor circuitry is to perform at least one of the first operations, the second operations, or the third operations to instantiate stream configuration generator circuitry to configure the data stream, and the stream configuration generator circuitry is to:

identify one or more source data stream parameters including at least one of a source service or a source appliance associated with the data stream;

identify one or more target data stream parameters including at least one of a target service, a target appliance, a first identifier of the target service, or a second identifier of the target appliance associated with the data stream;

identify a data type of payload data of the data packet, the model based on at least one of the one or more data stream parameters, the one or more target data stream parameters, or the data type; and cause storage of at least one of the one or more source data stream parameters, the one or more target data stream parameters, or the data type as second data stream parameters, the second data stream parameters including the one or more first data stream parameters, the stream configuration generator circuitry to configure the data stream based on the at least one of the one or more source data stream parameters, the one or more target data stream parameters, or the data type.

23. The apparatus of claim 21, wherein the processor circuitry is to perform at least one of the first operations, the second operations, or the third operations to instantiate stream configuration generator circuitry to:

identify a definition data stream parameter including a data type definition or a formula definition;

after a first identification of the definition data stream parameter as the data type definition, determine one or more bit locations of a bit stream of the data packet to extract, the execution of the model based on the one or more bit locations to extract; and after a second identification of the definition data stream parameter as the formula definition based on a compression or encryption of the bit stream, determine a decompression technique or a decryption technique, the execution of the model based on the decompression technique or the decryption technique.

24. The apparatus of claim 21, wherein the association is a first association, the data packet is a first data packet, the data stream is a first data stream, the model is a first model, the model output is a first model output, and wherein:

the data priority generator circuitry is to identify a second association of the first data stream and a second data stream;

the acceleration circuitry is to execute a second model based on the one or more data stream parameters to generate a second model output, the second model associated with the second data stream; and the data priority generator circuitry is to determine a third priority of a second data packet based on the second model output, the second data packet obtained after the first data packet.

25. The apparatus of claim 1, wherein the data stream is assigned the first priority prior to receiving the data packet.

* * * * *

UNITED STATES PATENT AND TRADEMARK OFFICE
CERTIFICATE OF CORRECTION

| | |
|---|---|
| PATENT NO. | : 12,348,424 B2 |
| APPLICATION NO. | : 17/359204 |
| DATED | : July 1, 2025 |
| INVENTOR(S) | : Francesc Guim Bernat et al. |

Page 1 of 1

It is certified that error appears in the above-identified patent and that said Letters Patent is hereby corrected as shown below:

In the Claims

In Column 65, Claim 14, Line 30, insert -- data -- between 'the' and 'packet'.

Signed and Sealed this
Ninth Day of September, 2025

Coke Morgan Stewart
*Acting Director of the United States Patent and Trademark Office*